(12) United States Patent
Kuwayama et al.

(10) Patent No.: US 9,176,341 B2
(45) Date of Patent: *Nov. 3, 2015

(54) DISPLAY APPARATUS

(71) Applicant: Sony Corporation, Tokyo (JP)

(72) Inventors: Tetsuro Kuwayama, Chiba (JP); Satoshi Tomioka, Kanagawa (JP); Ryo Miyao, Tokyo (JP); Yutaka Imai, Tokyo (JP)

(73) Assignee: SONY CORPORATION (JP)

( * ) Notice: Subject to any disclaimer, the term of this patent is extended or adjusted under 35 U.S.C. 154(b) by 14 days.

This patent is subject to a terminal disclaimer.

(21) Appl. No.: 13/861,116

(22) Filed: Apr. 11, 2013

(65) Prior Publication Data

US 2013/0278490 A1    Oct. 24, 2013

(30) Foreign Application Priority Data

Apr. 18, 2012    (JP) .................................. 2012-094420

(51) Int. Cl.
| | |
|---|---|
| *G09G 5/10* | (2006.01) |
| *G02F 1/1335* | (2006.01) |
| *G09G 3/34* | (2006.01) |
| *H04N 13/04* | (2006.01) |
| *H05B 37/02* | (2006.01) |

(52) U.S. Cl.
CPC .............. *G02F 1/1336* (2013.01); *G09G 3/342* (2013.01); *G09G 3/3406* (2013.01); *G09G 5/10* (2013.01); *H04N 13/0438* (2013.01); *H05B 37/0209* (2013.01); *G09G 2310/024* (2013.01); *G09G 2310/08* (2013.01); *G09G 2320/0233* (2013.01); *G09G 2320/064* (2013.01); *G09G 2320/0626* (2013.01)

(58) Field of Classification Search
None
See application file for complete search history.

(56) References Cited

U.S. PATENT DOCUMENTS

| | | | |
|---|---|---|---|
| 8,922,598 B2 * | 12/2014 | Kuwayama et al. | 345/690 |
| 2010/0188439 A1 * | 7/2010 | Sugimoto et al. | 345/690 |
| 2012/0274667 A1 * | 11/2012 | Kuwayama et al. | 345/690 |

FOREIGN PATENT DOCUMENTS

JP    2000-321551 A    11/2000

* cited by examiner

*Primary Examiner* — Joseph Haley
*Assistant Examiner* — Ifedayo Iluyomade
(74) *Attorney, Agent, or Firm* — Sheridan Ross P.C.

(57) ABSTRACT

A transmissive-type display device having a display area which is sequentially scanned; and a lighting device arranged on a rear face of the display device, including lighting units arranged so as to be aligned in a direction from one toward the other end portion side along a direction in which the display area is sequentially scanned. The lighting units are in a light emitting state over a light emitting period after sequential scanning of display units including portions of the display area corresponding to the lighting units is completed, and the lighting units are sequentially scanned from one toward the other end portion side in accordance with the sequential scanning of the display area. A length of waiting time from the completion of sequential scanning of the display unit until the corresponding lighting unit emits light is nonlinearly decreased.

20 Claims, 29 Drawing Sheets

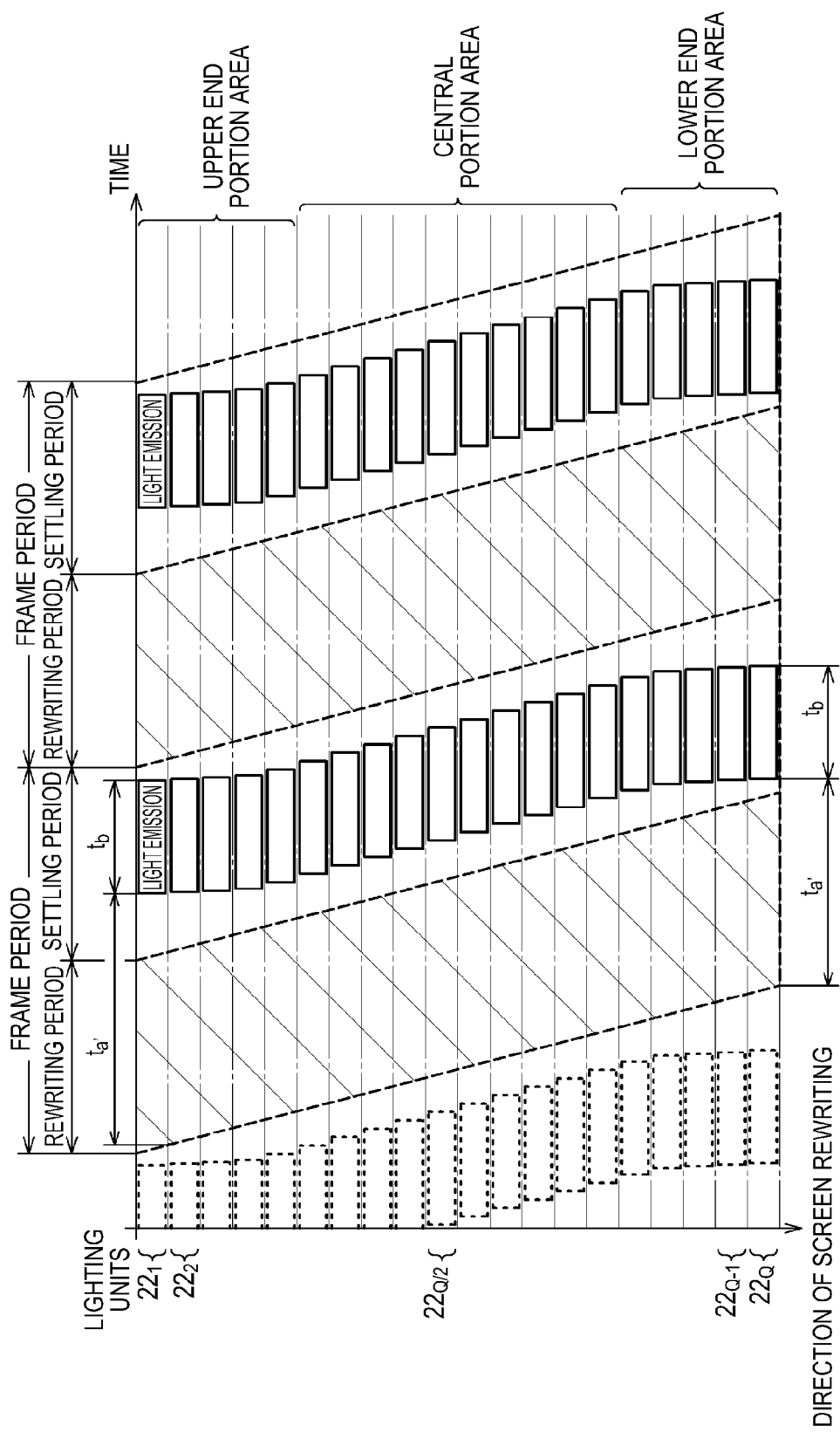

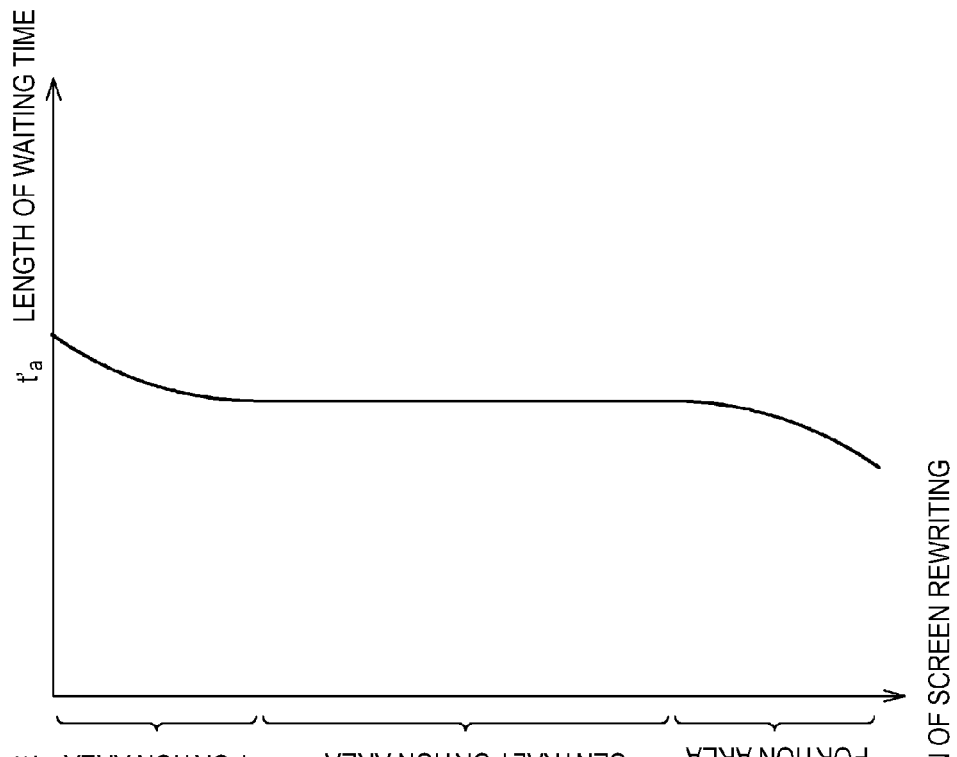
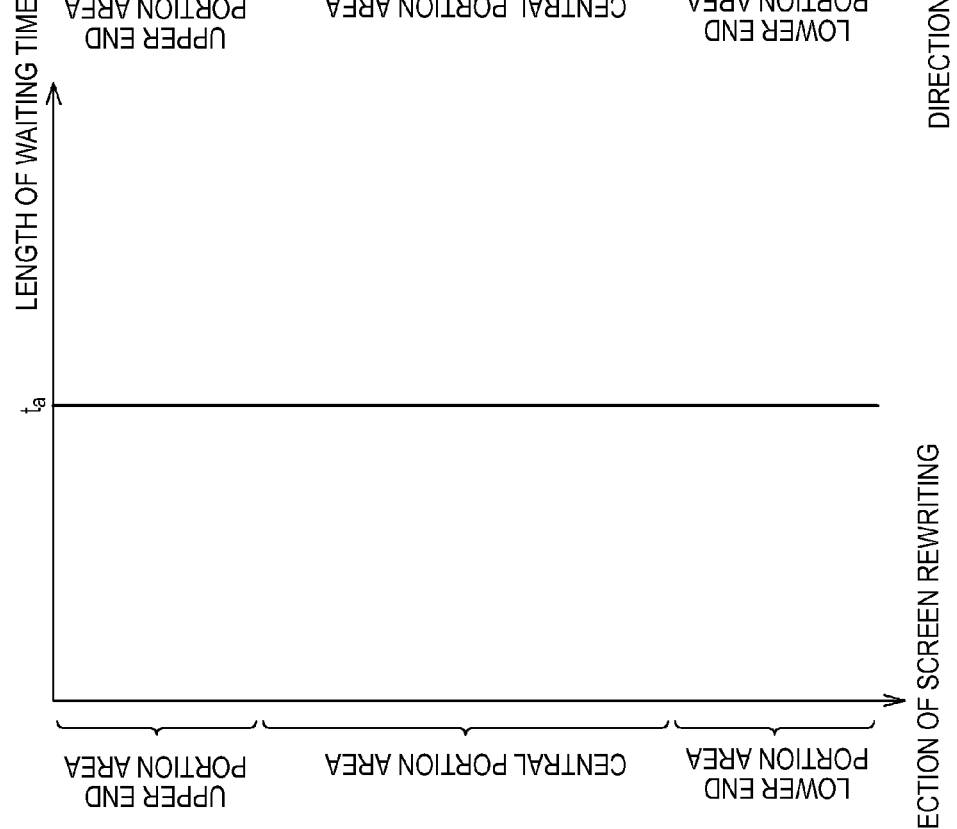

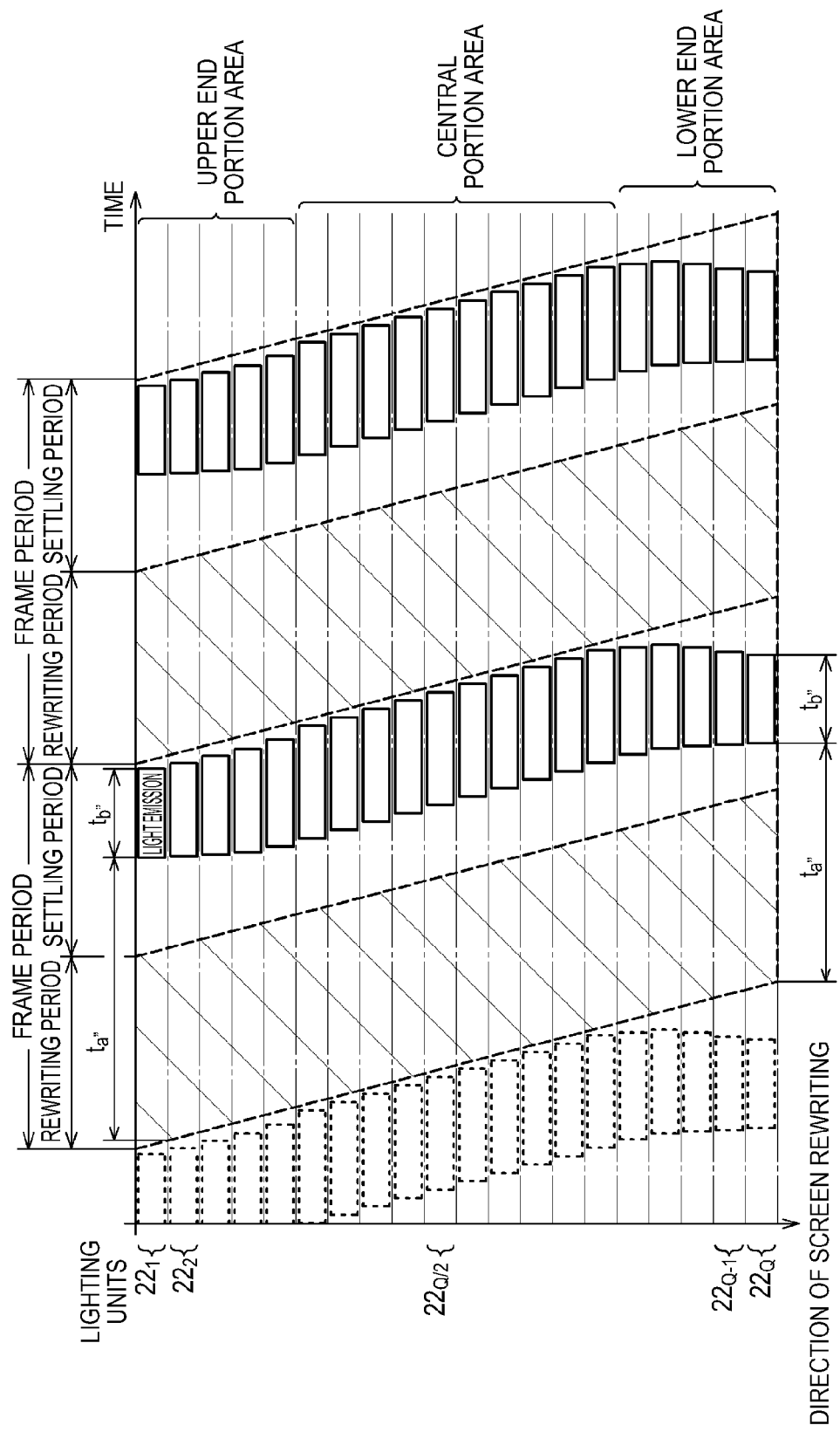

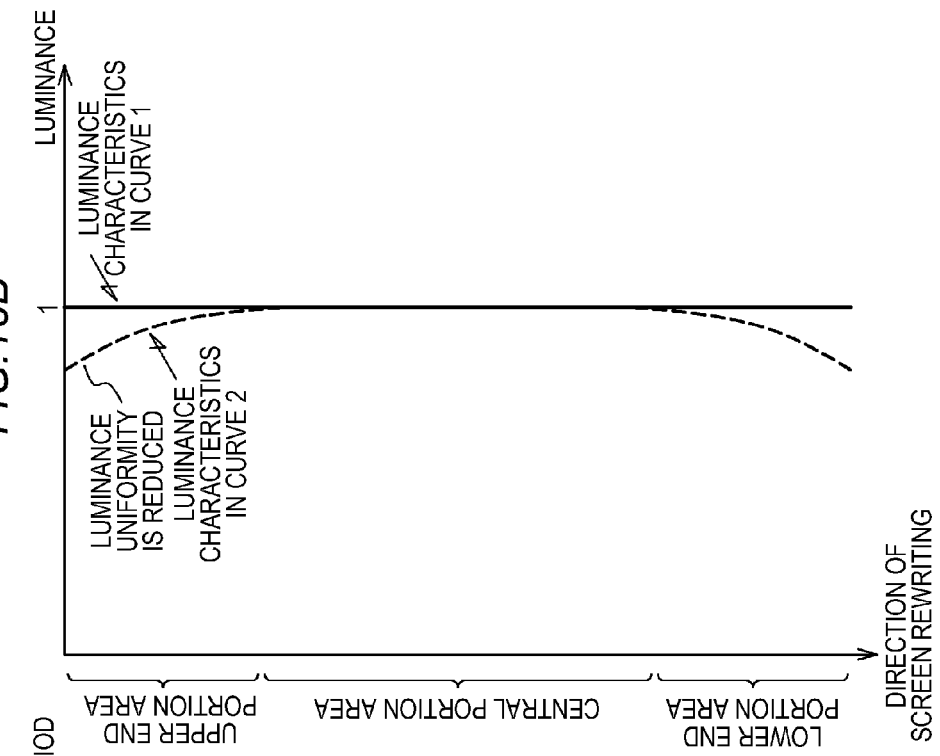
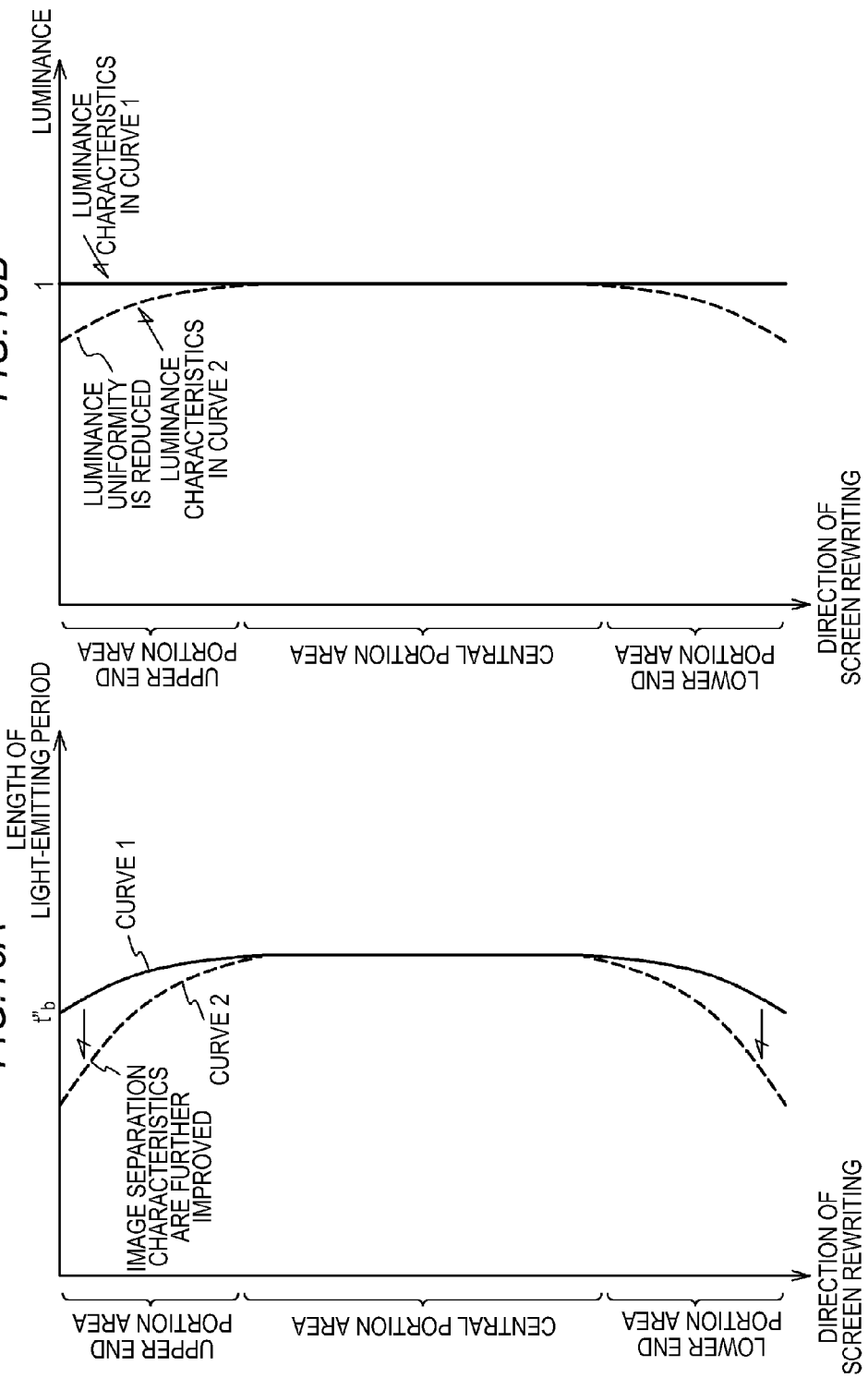

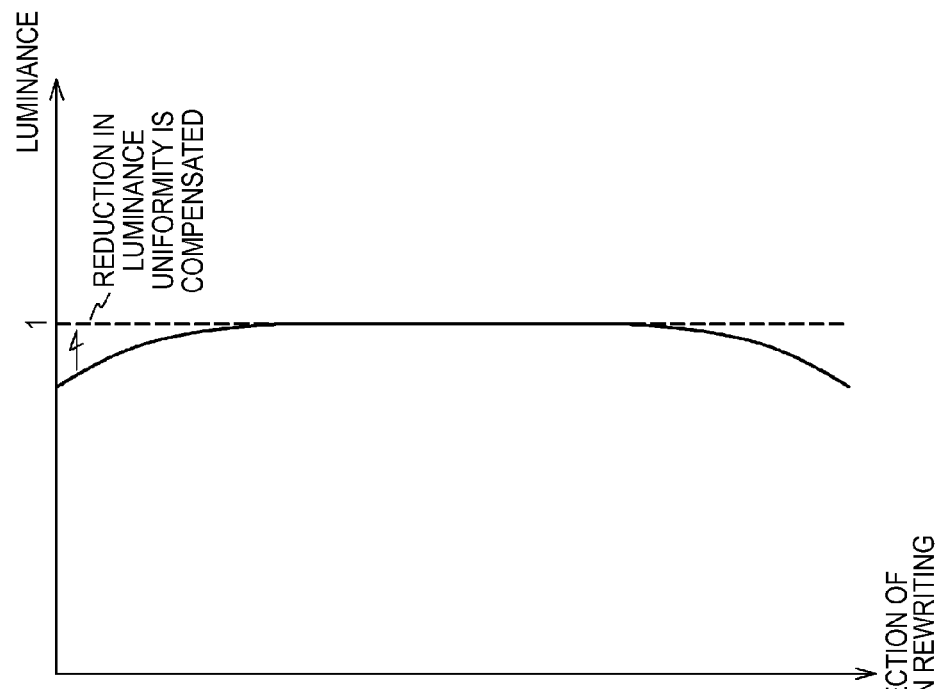
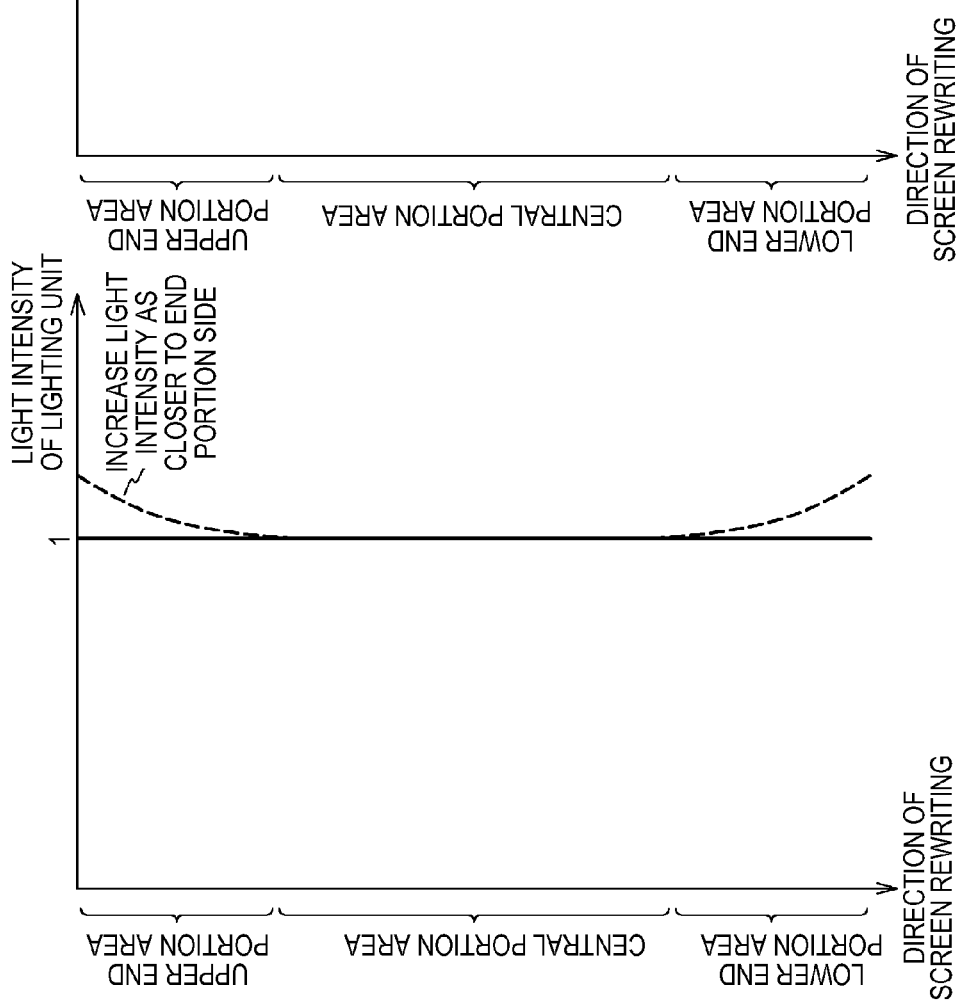

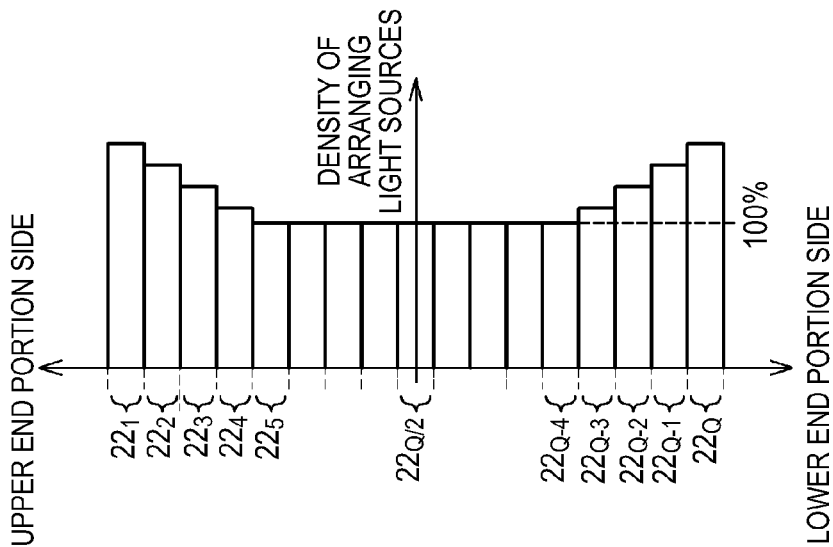
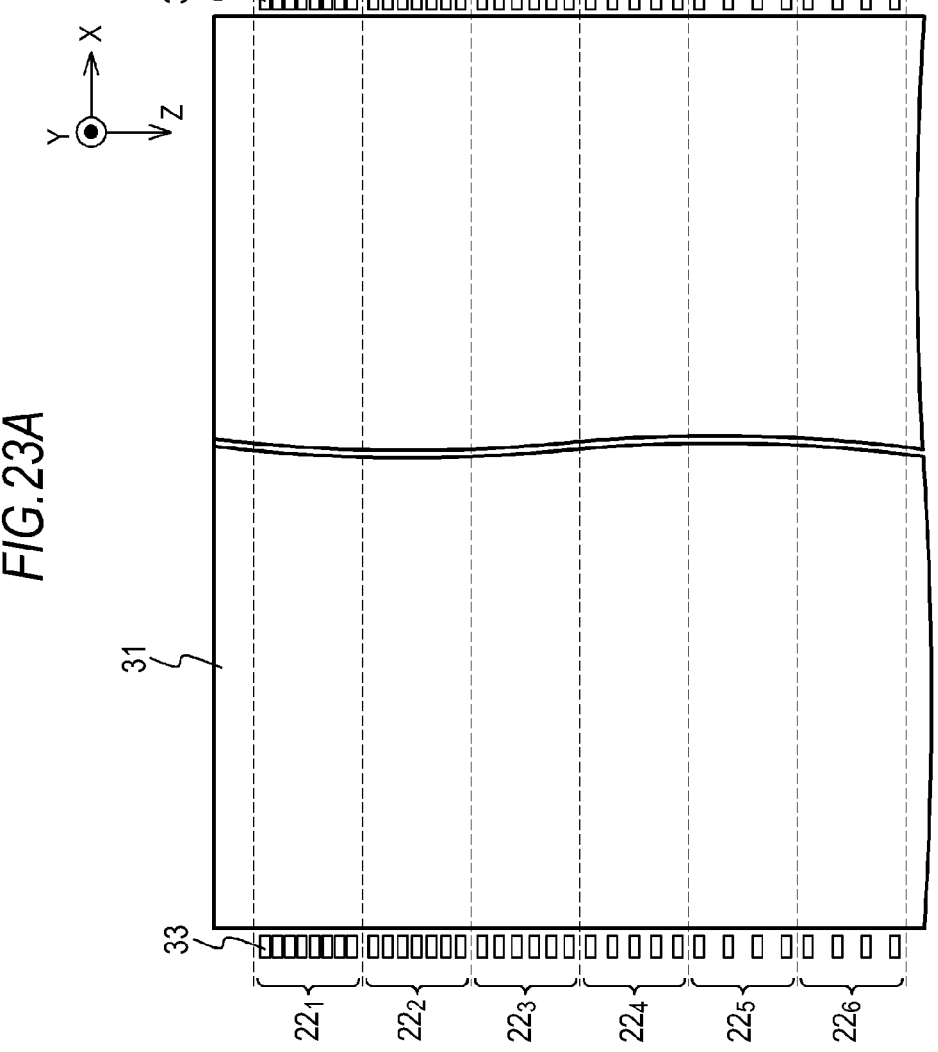

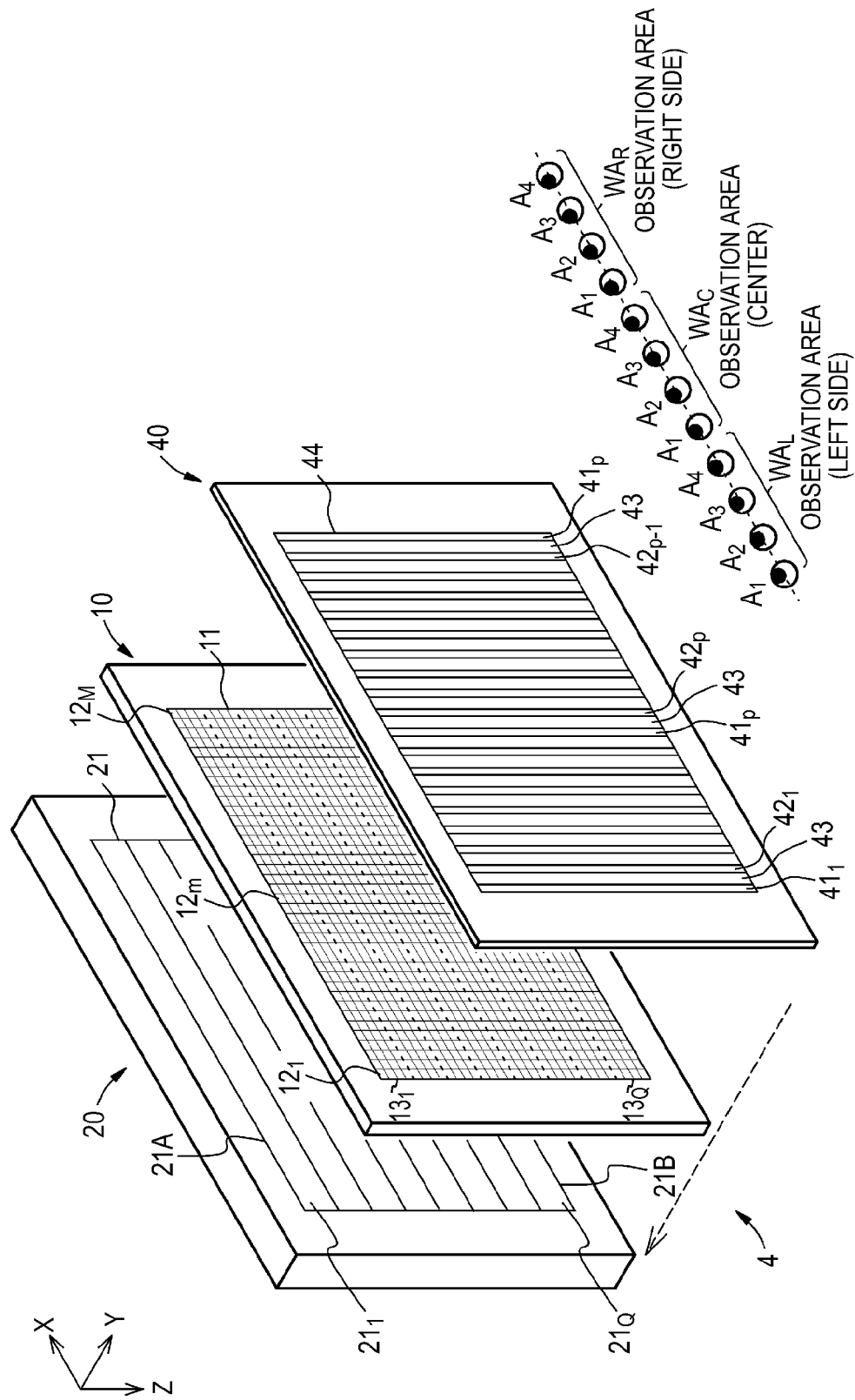

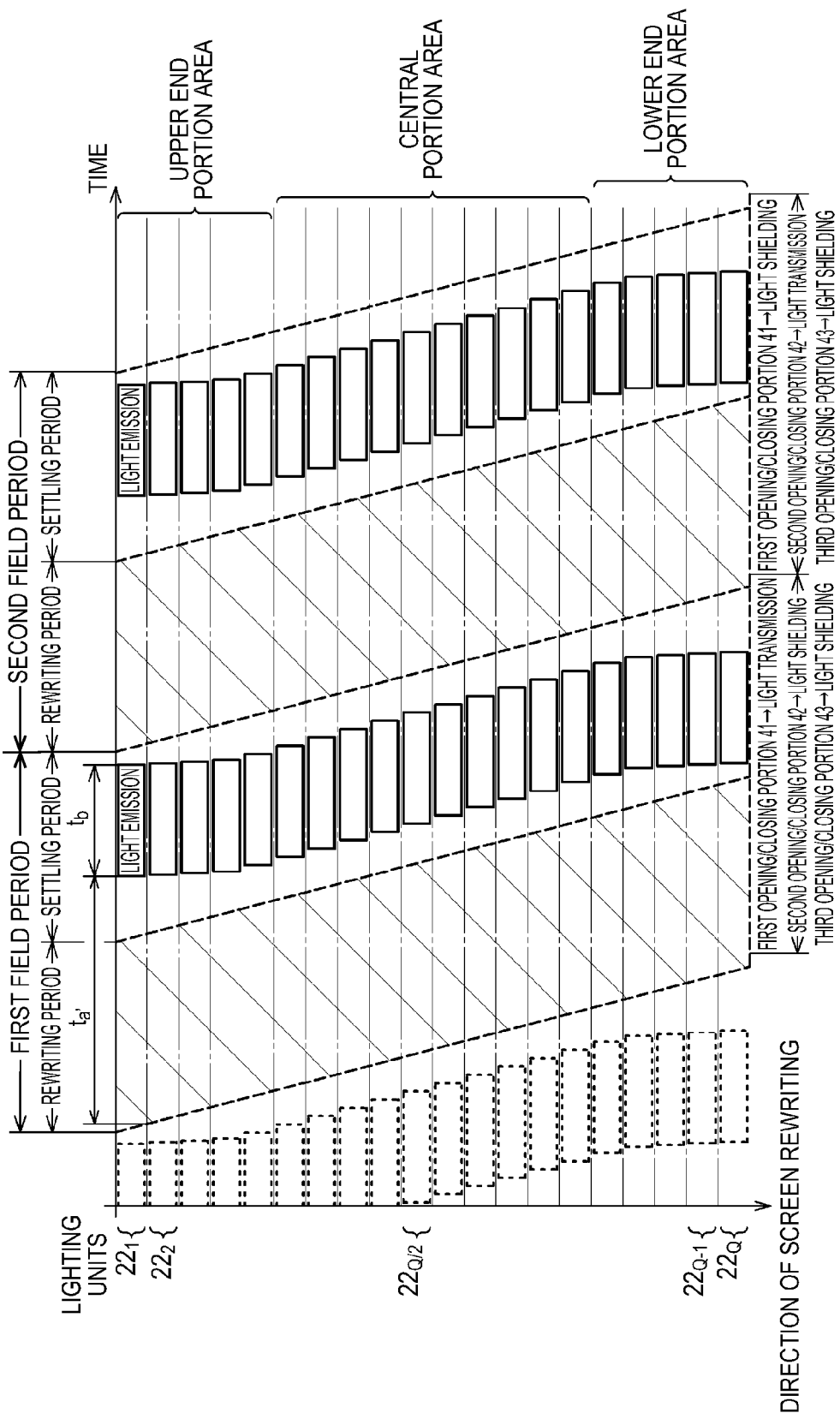

DISPLAY APPARATUS

FIELD

The present disclosure relates to a display apparatus.

BACKGROUND

A display apparatus configured so as to scan a direct-under type lighting device in synchronization with scanning of a transmissive-type display device such as a liquid crystal display panel to sequentially switch between a light-emitting area and a non-light emitting area is known by, for example, JP-A-2000-321551 (Patent Document 1). When such display apparatus is used, it is possible to reduce blur in moving pictures in a hold-type drive display device to thereby improve display quality of moving pictures.

SUMMARY

In the lighting device in which boundaries between the light-emitting area and the non-light emitting area are clearly visually recognized, bright lines or dark lines are seen in the vicinity of boundaries by the scanning of the lighting device, which causes luminance unevenness in an image to be displayed. Accordingly, the lighting device is normally designed so that light emitted from a light source corresponding to the light-emitting area also reaches the non-light emitting area to some degree. However, as a display area in which rewriting has not been completed is also irradiated by light from the lighting device, a phenomenon in which images are visually recognized in an overlapped state in consecutive two frames, which deteriorates image separation characteristics.

In view of the above, it is desirable to provide a display apparatus capable of suppressing deterioration in image separation characteristics.

An embodiment of the present disclosure is directed to a display apparatus including a transmissive-type display device having a display area which is sequentially scanned, and a lighting device arranged on a rear face of the display device, including plural lighting units arranged so as to be aligned in a direction from one end portion side toward the other end portion side along a direction in which the display area is sequentially scanned, in which the lighting units are in a light emitting state over a predetermined light emitting period after sequential scanning of display units including portions of the display area corresponding to the lighting units is completed, and the lighting units are sequentially scanned from one end portion side toward the other end portion side in accordance with the sequential scanning of the display area, and a length of waiting time from the completion of sequential scanning of the display unit until the corresponding lighting unit emits light is set to be nonlinearly decreased in accordance with the order of scanning the lighting units at least in an area located on one end portion side.

In the display apparatus according to the embodiment of the present disclosure, the length of waiting time from the completion of sequential scanning of the display unit until the corresponding lighting unit emits light is set to be nonlinearly decreased in accordance with the order of scanning the lighting units at least in an area located on one end portion side. Accordingly, the degree in which light is emitted from the lighting device even in an area where rewriting of a display panel is not completed is reduced. As a result, the deterioration in image separation characteristics can be suppressed.

BRIEF DESCRIPTION OF THE DRAWINGS

FIG. 11 is a schematic diagram for explaining scanning of the lighting device according to the first embodiment;

FIG. 12A is a schematic graph for explaining the relation between the scanning of the lighting device and waiting time in a reference example;

FIG. 12B is a schematic graph for explaining the relation between the scanning of the lighting device and waiting time according to the first embodiment;

FIG. 16 is a schematic diagram for explaining scanning of a lighting device according to a second embodiment;

FIGS. 18A and 18B are schematic graphs for explaining variations in characteristics obtained when the length of light-emitting period of the lighting units in end portion areas is set to be further shortened in the second embodiment;

FIGS. 19A and 19B are schematic graphs for explaining variations in characteristics obtained when light intensity of the lighting units is changed;

FIG. 23A is a schematic plan view of part of the lighting device for explaining a structure of the lighting device according to the third example in the third embodiment;

FIG. 23B is a schematic graph for explaining variation in the density of arranging the light sources of the lighting device;

FIG. 24 is a schematic perspective view of a display apparatus according to a fourth embodiment in a state of being virtually separated;

FIG. 29 is a schematic diagram for explaining the scanning of the lighting device and the operation of the optical separation device according to the fourth embodiment.

DETAILED DESCRIPTION

Figure 1:
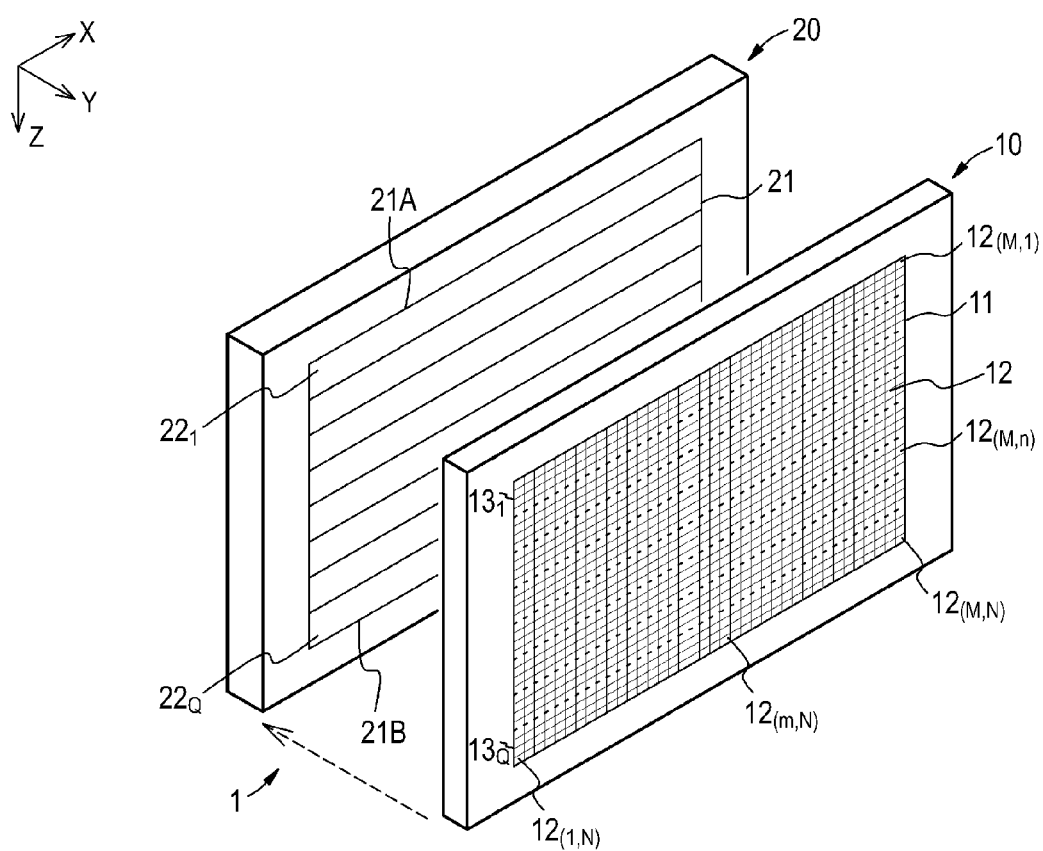
FIG. 1 is a schematic perspective view of a display apparatus according to a first embodiment in a state of being virtually separated.

Hereinafter, display apparatuses according to embodiments of the present disclosure will be explained with reference to the drawings. The present disclosure is not limited to the embodiments and various numeric values and materials in the embodiments are cited as examples. In the following explanation, the same symbols are used for the same components or components having the same functions, and repeated explanation is omitted. The explanation will be performed in the following order.

1. Overall Description of Display Apparatus According to Embodiment of Present Disclosure
2. First Embodiment
3. Second Embodiment
4. Third Embodiment
5. Fourth Embodiment (Others)

Overall Description of Display Apparatus According to Embodiment of Present Disclosure As described above, a display apparatus according to an embodiment of the present disclosure includes a transmissive-type display device having a display area which is sequentially scanned, and a lighting device arranged on a rear face of the display device, including plural lighting units arranged so as to be aligned in a direction from one end portion side toward the other end portion side along a direction in which the display area is sequentially scanned. The lighting units are in a light emitting state over a predetermined light emitting period after sequential scanning of display units including portions of the display area corresponding to the lighting units is completed, and the lighting units are sequentially scanned from one end portion side toward the other end portion side in accordance with the sequential scanning of the display area.

As the transmissive-type display device used in the embodiments of the present disclosure, for example, a well-known display member such as a transmissive-type liquid crystal panel can be used. The display device may perform monochrome display and color display. In the following embodiments, an active-matrix transmissive-type liquid crystal panel is used as the display device.

The liquid crystal display panel includes a front panel having a transparent common electrode, a rear panel having transparent pixel electrodes and a liquid crystal material arranged between the front panel and the rear panel. An operation mode of the liquid crystal display panel is not particularly limited. For example, the liquid crystal display panel may be driven by a so-called TN (Twisted Nematic) mode, may be driven by a VA (Vertical Alignment) mode and may be driven by an IPS (In-Plane Switching) mode.

More specifically, the front panel includes a substrate made of glass, the transparent common electrode (for example, ITO (Indium Tin Oxide) provided inside the substrate and a polarizing film provided on an outer surface of the substrate. In the case of color display, color filters covered with an overcoat layer made of acrylic resin or epoxy resin are provided inside the substrate, and the transparent common electrode is formed on the overcoat layer. An alignment film is formed on the transparent electrode, if necessary.

The rear panel includes a substrate made of glass, switching devices formed inside the substrate and pixel electrodes (made of, for example, ITO) conductive/non-conductive of which is controlled by the switching devices. A polarizing film is provided on an outer surface of the substrate. An alignment film is formed on the entire surface including the pixel electrodes, if necessary.

Various types of members and materials forming the liquid crystal display panel may be well-known members and materials. As the switching device, for example, 3-terminal devices such as a thin-film transistor (TFT) and 2-terminal devices such as a MIM (Metal Insulator Metal) device, a varistor device and a diode can be cited as examples. For example, scanning lines extending in a row direction and signal lines extending in a column direction are connected to these switching devices.

As a semi-transmissive type display device having both characteristics of a reflective type and the transmissive type, for example, a semi-transmissive-type liquid crystal display panel having both display areas of the reflective type and the transmissive type in pixels is known. Such semi-transmissive type display device may be used. That is, the "transmissive-type display device" includes the "semi-transmissive type display device".

When the number of pixels M×N in the display device is represented by (M, N), some of resolutions for image display can be cited as values of (M, N), which are, specifically, VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), and further, (3840, 2160), (1920, 1035), (720, 480), (1280, 960) and so on, however, the present disclosure is not limited to these values.

In the display device, a display unit having a portion of the display area corresponding to a lighting unit basically includes pixels in a given number of rows aligned in a scanning direction. The number of pixel rows in respective display units is preferably the same, however, it is not limited to this.

The type of the lighting device is not particularly limited. For example, the lighting device may be a direct-under type structure or may be an edge light type structure.

The lighting device preferably has three or more lighting units. One lighting unit preferably corresponds to a portion of the display area including at least 10 to 20 rows. With the objective of delicate control, the number of lighting units is preferably large. However, as the scale of a circuit driving the lighting device is increased in accordance with the number of lighting units, the number of lighting units may be selected in accordance with specifications and design of the display apparatus.

As light sources for the lighting units, for example, a light-emitting diode (LED), a cold-cathode ray fluorescent ramp and an electroluminescence (EL) device can be cited. With the objective of size reduction of the light source, the light-emitting diode (LED) is preferable used as the light source. In this case, a red light-emitting diode, a green light emitting diode and a blue light-emitting diode are formed as a set to obtain white light, or the white light can be obtained by a white light-emitting diode (for example, a light-emitting diode emitting white by combining an ultraviolet or blue light-emitting diode with fluorescent particles). In a former case, light-emitting diodes emitting the forth color, the fifth color . . . in addition to red, green and blue may be included.

The lighting device may have optical members, for example, an optical function sheet such as a light diffusion sheet, a light guide plate and the like, in addition to the above-described light sources. The optical function sheet is arranged on, for example, a surface of the lighting device facing the display device.

As described above, in the display apparatus according to the embodiment of the present disclosure, a length of waiting time from completion of sequential scanning of the display unit until the corresponding lighting unit emits light is set to be nonlinearly decreased in accordance with the order of scanning the lighting units at least in an area located on one end portion side. The length may be nonlinearly decreased in accordance with the order of scanning the lighting units in an area located on one end portion side or may be nonlinearly decreased in accordance with the order of scanning the lighting units in an area located on the other end portion side. It is also preferable that the length is nonlinearly decreased in accordance with the order of scanning the lighting units in the area located on one end portion side and the area located on the other end portion side.

In the display apparatus according to the embodiment of the present disclosure including the above various preferable structures, a period from the time when the lighting unit located on one end portion side emits light until the lighting unit located on the other end portion side emits light can be shorter than a period from the start to the end of sequential scanning in the display area.

In the display apparatus according to the embodiment of the present disclosure including the above various preferable structures, a light emitting period of a lighting unit arranged in an area located on the end portion side may be set so as to be shortened as the lighting unit is located closer to the end portion side.

In the display apparatus according to the embodiment of the present disclosure including the above various preferable structures, light intensity of the lighting unit arranged in the area located on the end portion side is set to be increased as the lighting unit is located closer to the end portion side. In such as case, each lighting unit may have a light source a light-emitting state of which can be controlled, and the light source of the lighting unit located closer to the end portion side may be driven to emit light brighter. In addition, each lighting unit may have a light source a light-emitting state of which can be controlled, and the density of arranging light sources in the lighting unit arranged in the area located on the end portion side may be set to be higher as the lighting unit is located closer to the end portion side.

In the display apparatus according to the embodiment of the present disclosure including the above various preferable structures, the display apparatus may further include an optical separation device for separating an image to be displayed on the display device into images for plural viewpoints.

The structure of the optical separation device is not particularly limited. As the optical separation device, well-known members such as a parallax barrier or a lens sheet typified by a lenticular lens may be used. The optical separation device may have a fixed configuration as well as have a configuration which can be dynamically changed.

For example, a parallax barrier having a fixed configuration may be formed using a known material by using a known method such as a combination of a photolithographic method and an etching method, any of various printing methods including a screen printing method or an ink jet printing method, a plating method including an electroplating method and an electroless plating method, or a lift-off method. On the other hand, a parallax barrier having a dynamic configuration, for example, may be configured by a light valve using a liquid crystal material. As a lens sheet having a fixed configuration, for example, a known lenticular lens may be used. In addition, as a lens sheet having a dynamic configuration, for example, a gradient index lens using a liquid crystal material may be used.

A main control section controlling the display apparatus may be configured by various circuits such as a video signal generating section, a data driver, and a timing controller. A scanning circuit scanning the display device may be configured by using a shift register circuit or the like, and a lighting device drive circuit driving the lighting device may be configured by a shift register circuit, a light source drive circuit, and the like. An optical separation device drive circuit driving the optical separation device may be configured by a shift register circuit or the like. These can be configured by using known circuit devices.

2. First Embodiment

A first embodiment relates to the display apparatus in the present disclosure.

Figure 2A:
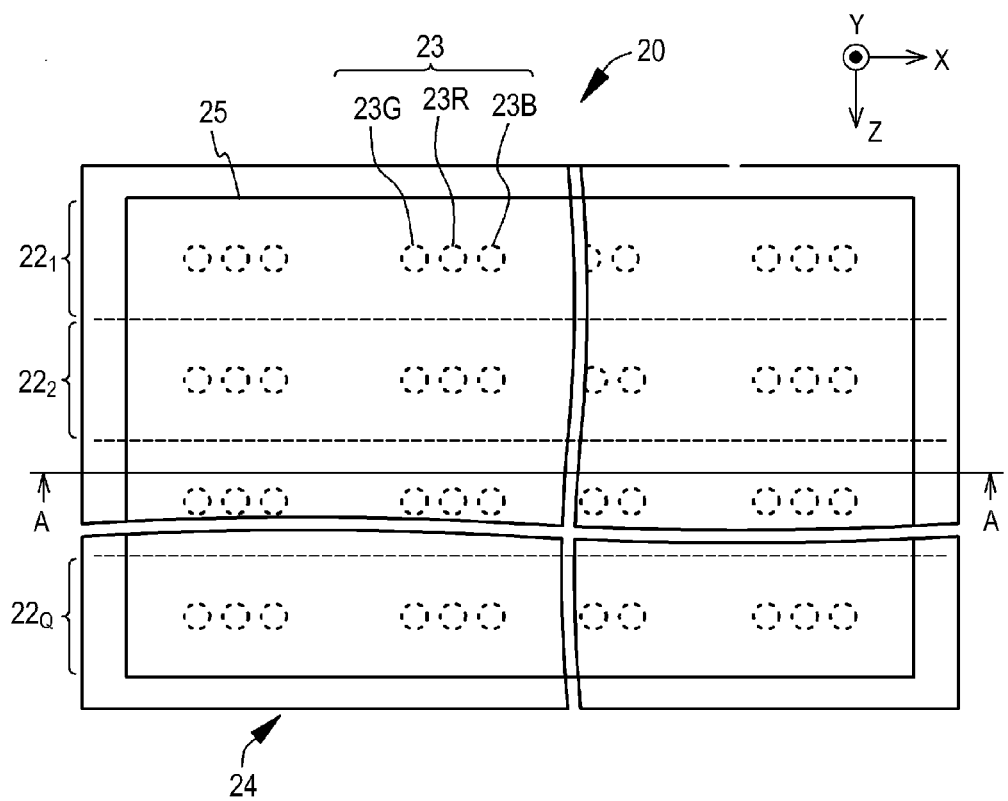
FIG. 2A is a schematic plan view of a lighting device.
Figure 2B:
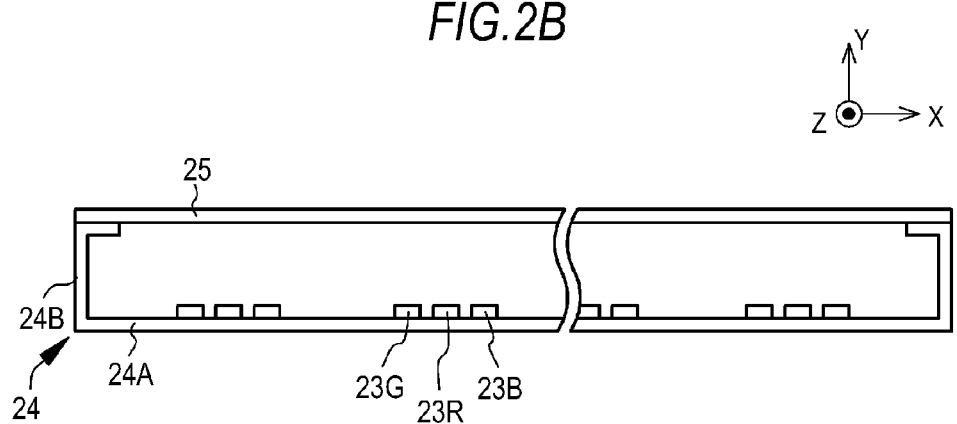
FIG. 2B is a schematic cross-sectional view of the lighting device in a state of being cut along a line A-A of FIG. 2A.

FIG. 1 is a schematic perspective view of a display apparatus according to a first embodiment in a state of being virtually separated. FIG. 2A is a schematic plan view of a lighting device. FIG. 2B is a schematic cross-sectional view of the lighting device in a state of being cut along a line A-A of FIG. 2A.

As shown in FIG. 1, a display apparatus 1 according to the first embodiment includes a transmissive-type display device 10 having a display area 11 which is sequentially scanned, and a lighting device 20 arranged on a rear face of the display device 10, including plural lighting units 22 arranged so as to be aligned in a direction from one end portion 21A side toward the other end portion 21B side along a direction in which the display area 11 is sequentially scanned.

For convenience of explanation, the display area 11 of the display device 10 is assumed to be in parallel to an X-Z plane and an observer of an image is positioned in a +Y direction. Additionally, assume that planer shapes of a light-emitting surface 21 including a group of lighting units 22 and the display area 11 correspond to each other, and further, planer shapes of respective lighting units 22 are the same to one another.

In the display area 11 of the display device 10, M-pieces of pixels 12 in a row direction (an X-direction in the drawing) and N-pieces of pixels 12 in a column direction (a Z-direction in the drawing), that is, M×N pieces of pixels 12 in total are arranged. The pixel 12 in the m-th column (here, m=1, 2, . . . , M) and in the n-th row (here, n=1, 2, . . . , N) is represented as the (m, n)th pixel 12 or the pixel $12_{(m, n)}$. The pixels 12 in the m-th column may be represented as pixels 12m. The number of pixels (M, N) in the display device 10 is, for example, (1920, 1080). The same applies to display devices in other embodiments.

The display device 10 is formed by an active-matrix type liquid crystal display panel. Though the liquid crystal display panel performs monochrome display for convenience of explanation, this is merely an example.

The display device 10 includes a front panel positioned so as to face the observer of the image, a rear panel positioned so as to face the lighting device 20, a liquid crystal material arranged between the front panel and the rear panel, and other components. For convenience in drawing, the display device 10 is shown as a piece of panel in FIG. 1.

The lighting device 20 having a so-called direct-under type structure includes plural (Q-pieces of) lighting units 22. Respective lighting units 22 illuminates display units 13 including portions of the display area corresponding to the lighting units 22 from the rear face. The light sources included in the lighting units 22 are controlled in units of the lighting units 22.

As shown in FIGS. 2A and 2B, the lighting device 20 includes a casing 24 having a bottom surface 24A and side surfaces 24B, and light sources 23 (a red light-emitting diode 23R, a green light-emitting diode 23G and a blue light-emitting diode 23B) having sets of light-emitting diodes arranged on the bottom surface 24A so as to correspond to respective lighting unit 22. In the example shown in FIGS. 2A and 2B, plural sets of light-emitting diodes are arranged in one lighting unit 22. Red light, green light and blue light are mixed, thereby obtaining white light with high color purity as an illumination light.

As described later, the lighting units 22 are sequentially scanned. The light sources 23 of the scanned lighting units 22 emit light, and the light is transmitted through an optical function sheet 25 made of a light diffusion sheet and so on to illuminate the display units 13 corresponding to the lighting units 22 from the rear face.

The lighting device is not limited to the above-described structure, and it is also preferable to apply a structure of including a light guide plate made of a transparent material such as acrylic resin and light sources arranged on a side surface of the light guide plate (a so-called edge light type structure).

Figure 3:
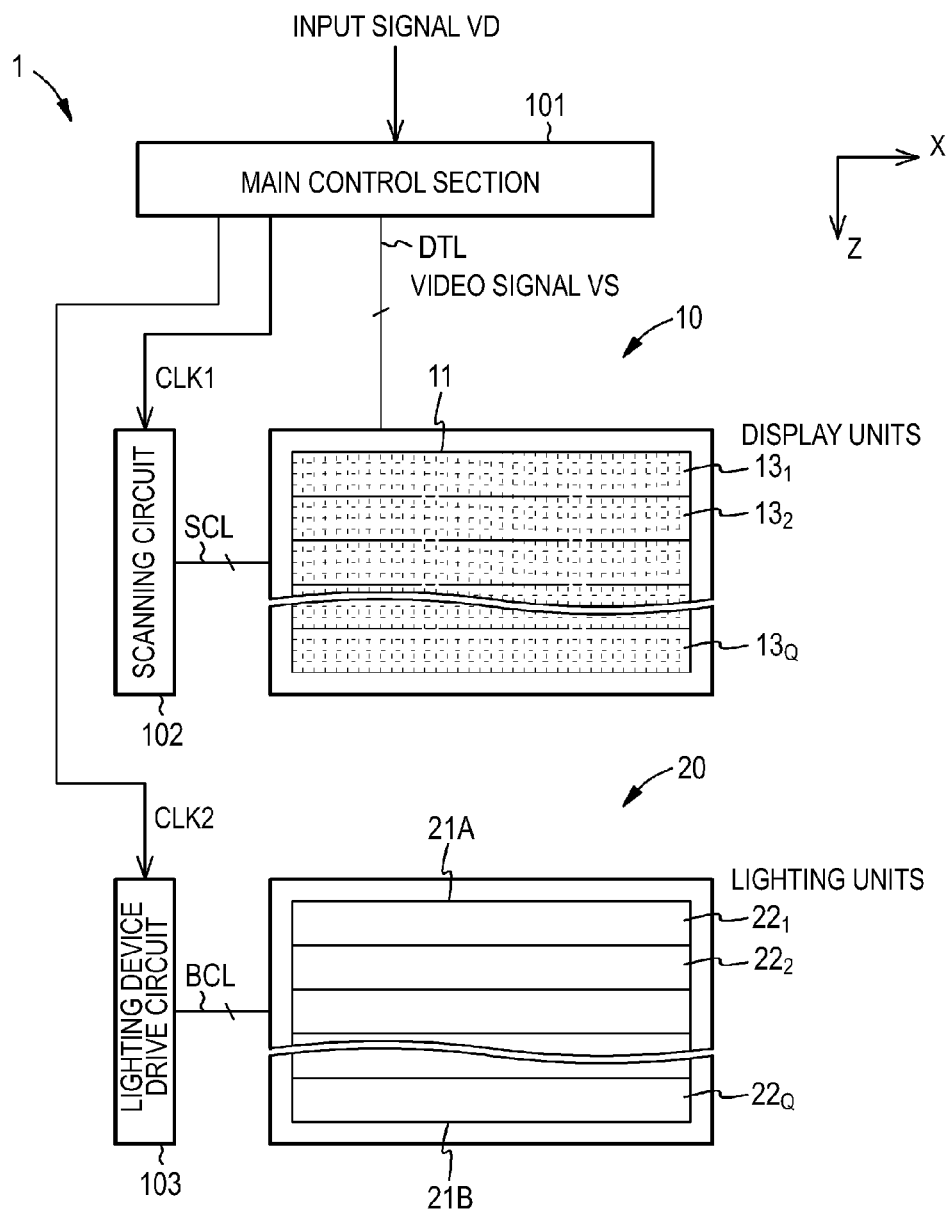
FIG. 3 is a conceptual diagram of a display apparatus according to the first embodiment.

FIG. 3 is a conceptual diagram of the display apparatus according to the first embodiment.

The display apparatus 1 is driven by a main control section 101 to which a signal from the outside is inputted, a scanning circuit 102 scanning the display device 10 and a lighting device drive circuit 103 driving the lighting device 20. In FIG. 1, the circuits such as the main control section 101, the scanning circuit 102 and the lighting device drive circuit 103 are not shown.

An input signal VD corresponding to an image to be displayed is inputted to the main control section 101. The main control section 101 generates a video signal VS based on the input signal VD, sequentially applying the video signal VS to data lines DTL of the display device 10.

The main control section 101 also generates a clock signal CLK1 controlling the scanning timing of the display area by the scanning circuit 102 and a clock signal CLK2 controlling the scanning timing of the lighting units 22 by the lighting device drive circuit 103. The main control section 101 can be formed by well-known circuits such as a logic circuit, a latch circuit and a shift register circuit. The scanning circuit 102 can be formed by well-known circuits such as the shift register circuit, and further, the lighting device drive circuit 103 can be formed by well-known circuits such as the shift register circuit and a light-source drive circuit.

The scanning circuit 102 sequentially applies a scanning signal to scanning lines SCL to thereby sequentially scan the display area 11. More specifically, line-sequential scanning is performed line by line in the first embodiment. The direction of scanning is the Z-direction. The lighting device drive circuit 103 sequentially applies a control signal to control lines BCL to thereby sequentially scan the lighting units 22.

The line-sequential scanning is not limited to the line-by-line scanning. For example, it is possible to apply a configuration in which data lines are provided independently so as to correspond to odd-number lines and even-number lines, and line-sequential scanning of two lines is performed at the same time, through depending on the structure of the display device. That is, the "line-sequential scanning" includes simultaneous scanning of plural lines in addition to the line-by-line scanning.

The display area 11 including the pixels 12 arranged in a two-dimensional matrix is virtually divided into Q-pieces of display units 13. When the divided state is expressed by "row" and "column", the display area 11 is divided into display units of Q-rows and one column.

As planer shapes of respective lighting units 22 are the same, the display area 11 is equally divided in principle. In this case, the display unit 13 includes the pixels 12 of (N/Q) rows and M columns. For example, when (M, N)=(1920, 1080) and Q=20, the display unit 13 includes the pixels 12 of 54 rows and 1920 columns. In the case where there is a fraction below a decimal point in (N/Q), it may be appropriately distributed to the display units.

Figure 4:
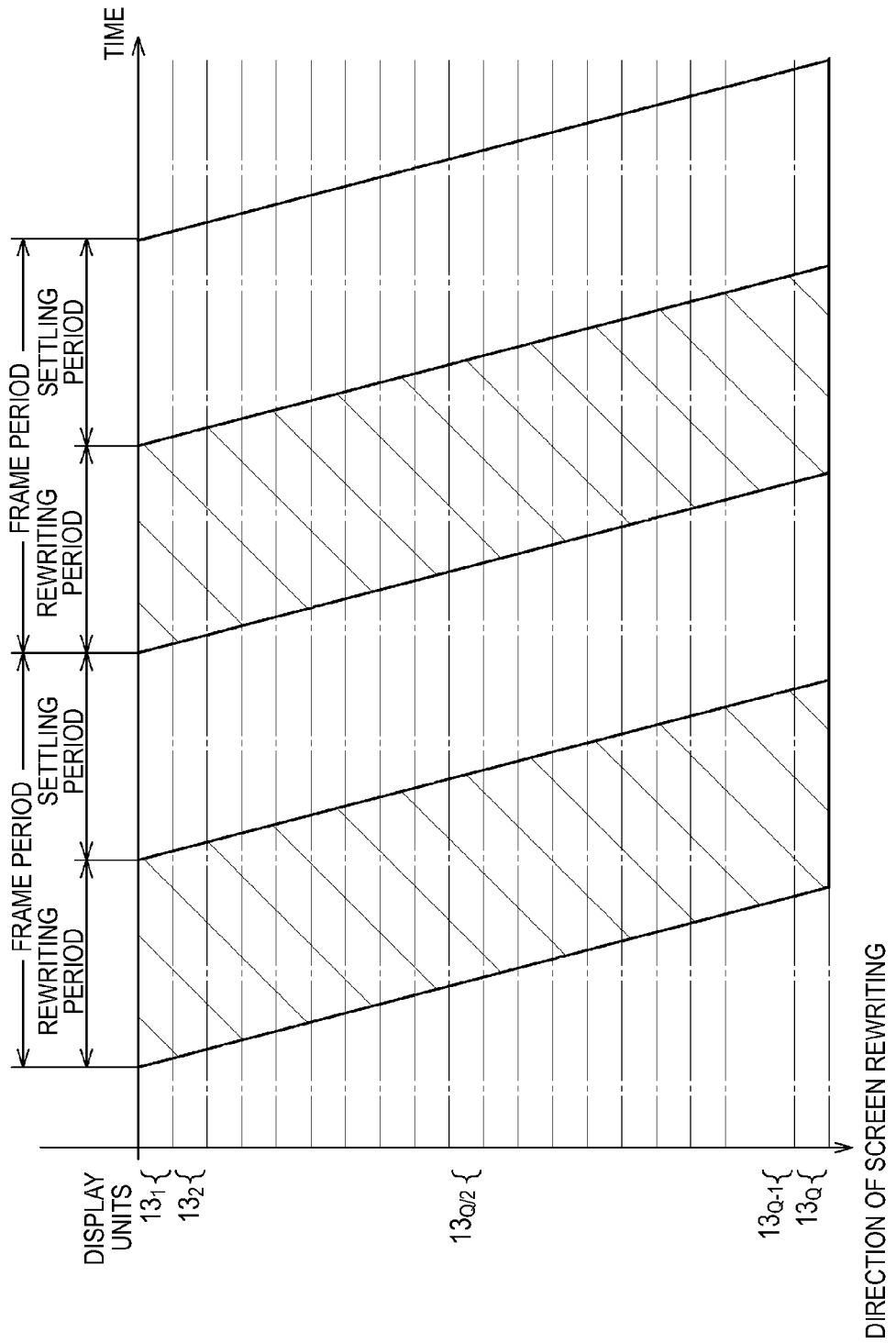
FIG. 4 is a schematic diagram for explaining the scanning of a display device.

FIG. 4 is a schematic diagram for explaining the scanning of the display device.

The display area 11 is sequentially scanned toward the Z-direction. Accordingly, when displaying one frame, the pixels 12 included in a display unit $13_1$ is scanned first, then, the pixels 12 included in respective display units 13 are scanned in the order of the display units $13_2, 13_3 \ldots, 13_{Q-1}, 13_Q$. A certain period of time is necessary for a writing operation of a new video signal to the pixels 12 and for settling the state of pixels after that. When the period is represented as a rewriting period and a remaining period is represented as a settling period, the scanning of the display device 10 can be schematically represented as shown in FIG. 4. It is also preferable to write the same data twice for promoting the settlement of the state of pixels. In this case, the settling period is started, for example, when the second writing is completed.

In the first embodiment, a length of waiting time from completion of sequential scanning of the display unit 13 until the corresponding lighting unit 22 emits light is set to be nonlinearly decreased in accordance with the order of scanning the lighting units 22 at least in an area located on one end portion side based on operations of the main control section 101 and so on. More specifically, the length is nonlinearly decreased in accordance with the order of scanning the lighting units 22 in the area located on one end portion side and the area located on the other end portion side. First, an operation of a reference example in which the length of waiting time is constant regardless of the order of scanning the lighting units 22 and problems thereof will be explained for helping the understanding of the present disclosure.

Figure 5:
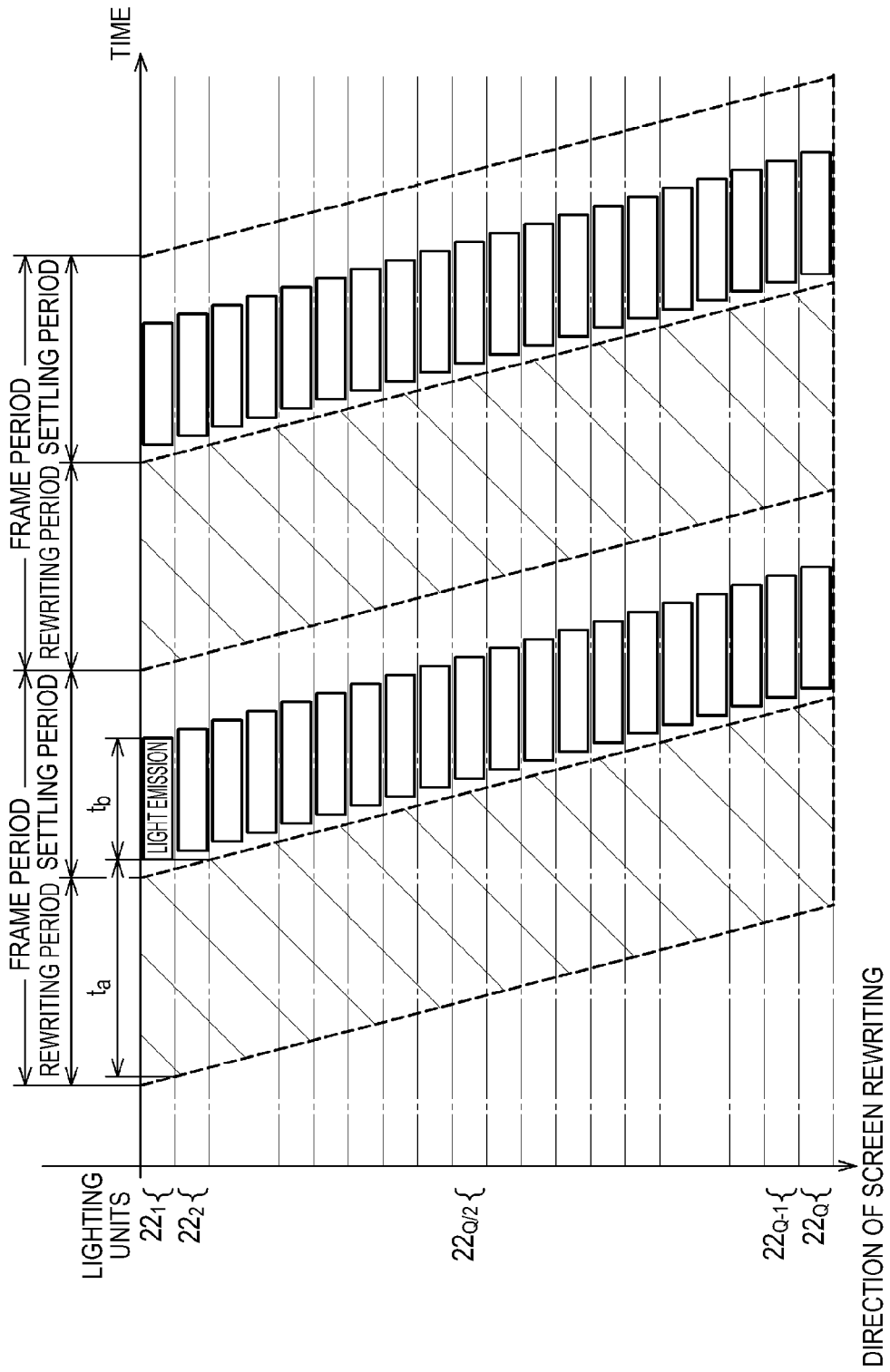
FIG. 5 is a schematic diagram for explaining the scanning of the lighting device in a reference example.

FIG. 5 is a schematic diagram for explaining the scanning of the lighting device in the reference example.

In the operation according to the reference example, the length of waiting time is constant regardless of the order of scanning the lighting units 22. For convenience of explanation, the length of waiting time in the reference example is assumed to be a period of time from the completion of the scanning of the display unit 13 until the display unit 13 located one low below the above display unit 13 becomes in the settling period. When the waiting time is represented as a symbol $t_a$ and a light-emitting period of the lighting unit 22 is represented as a symbol $t_b$, the scanning of the lighting device 20 can be schematically represented as shown in FIG. 5. Broken lines in FIG. 5 show the scanning timing of the display device 10 shown in FIG. 4.

If the light-emitting period of each lighting unit 22 is included in the settling period in the corresponding display unit 13, images in two frames are not visually recognized in an overlapped state in a theoretical sense. However, when light from the light source 23 of the lighting unit 22 reaches another lighting unit 22, images in two frames are visually recognized in the overlapped state. Hereinafter, explanation will be made with reference to FIG. 6 to FIG. 10.

Figure 6:
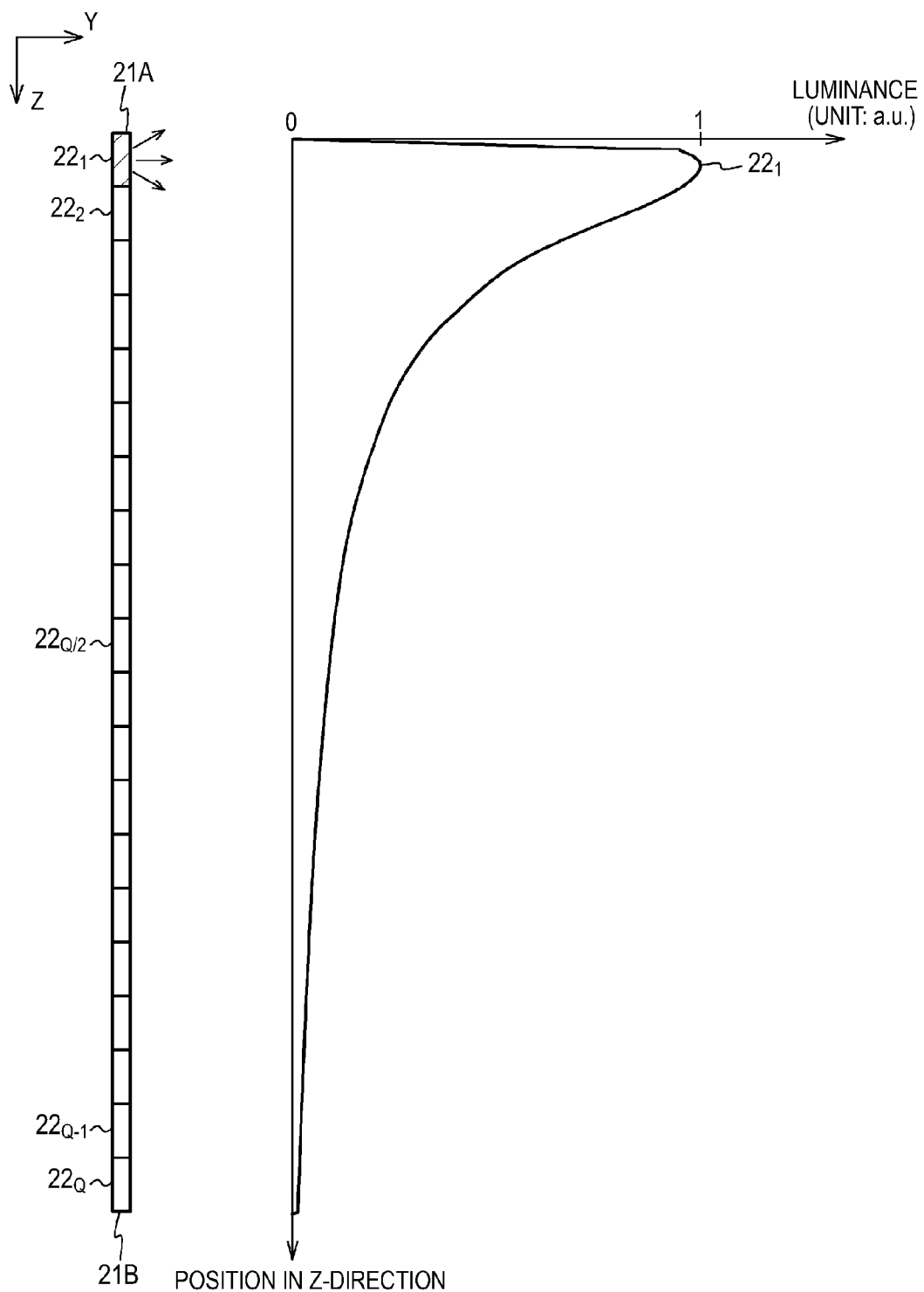
FIG. 6 is a schematic graph showing a luminance distribution of the lighting device obtained when a light source corresponding to a lighting unit in the first row emits light.
Figure 7:
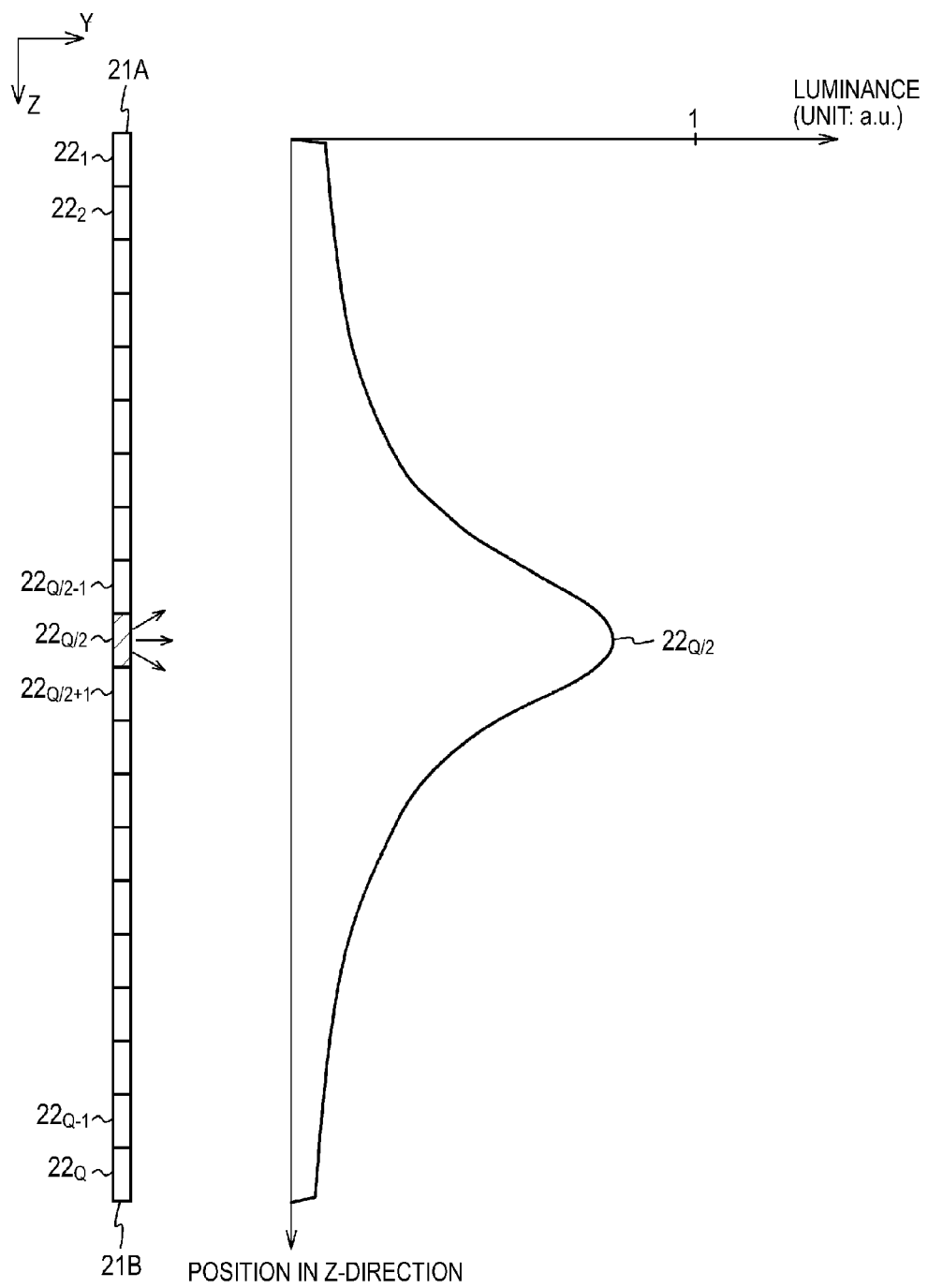
FIG. 7 is a schematic graph showing a luminance distribution of the lighting device obtained when a light source corresponding to a lighting unit in the (Q/2)th row emits light.
Figure 8:
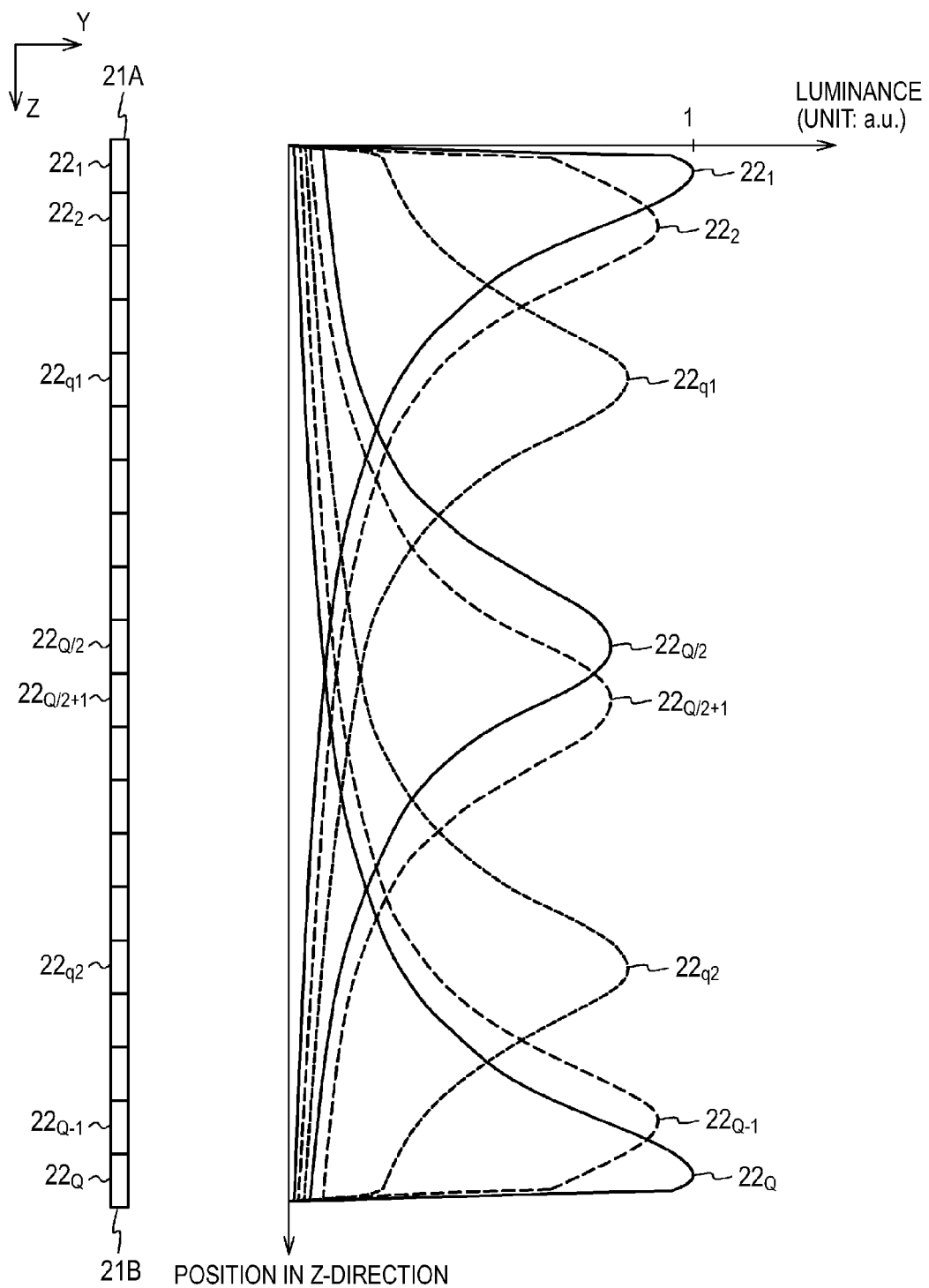
FIG. 8 is a schematic graph for explaining the relation between light emission of light sources corresponding to the lighting units and luminance distributions of the lighting device.

FIG. 6 is a schematic graph showing a luminance distribution of the lighting device obtained when the light source corresponding to the lighting unit in the first row emits light. FIG. 7 is a schematic graph showing a luminance distribution of the lighting device obtained when the light source corresponding to the lighting unit in the (Q/2)th row emits light. FIG. 8 is a schematic graph for explaining the relation between light emission of the lighting units and luminance distributions of the lighting device.

As shown in FIG. 6, the luminance is the highest on a surface of the lighting unit $22_1$ when the light source 23 corresponding to the lighting unit $22_1$ in the first row emits light. Then, light from the light source of the lighting unit $22_1$ also reaches lighting units $22_2$ to $22_Q$, and a profile of luminance is represented by a graph in FIG. 6. A horizontal axis in the graph is in an arbitrary unit, in which the highest value of luminance obtained when the light source 23 corresponding to the lighting unit $22_1$ emits light is set to 1. The same applies to the other drawings.

A profile of luminance obtained when the light source 23 corresponding to the lighting unit $22_Q$ in the Q-th row emits light will be a profile inverted with respect to the graph of FIG. 6.

As shown in FIG. 7, luminance is the highest on a surface of the lighting unit $22_{Q/2}$ when the light source 23 corresponding to the lighting unit $22_{Q/2}$ in the (Q/2) row emits light. However, the highest luminance is reduced as compared with FIG. 6 due to change of conditions such as light reflection in the casing 24 of the lighting device 20. Qualitatively, the value of the highest luminance on the surface is further decreased as the lighting unit 22 is located closer to the center. Light from the light source of the lighting unit $22_{Q/2}$ also reaches the lighting units $22_1$ to $22_{Q/2-1}$ as well as the lighting units $22_{Q/2+1}$ to $22_Q$, and a profile of luminance is represented by a graph in FIG. 7.

Consequently, the relation between light emission of the light sources 23 corresponding to the lighting units 22 and luminance distributions of the lighting device 20 are represented as shown in FIG. 8. In FIG. 8, profiles of luminance in lighting units $22_1$, $22_2$, $22_{Q/2}$, $22_{Q/2+1}$, $22_{Q-1}$ and $22_Q$ are shown as examples, and further, a profile of luminance in a certain lighting unit $22_{s1}$ arranged between the lighting units $22_2$ and $22_{Q/2}$, and a profile of luminance in a certain lighting unit $22_{q2}$ arranged between the lighting units $22_{Q/2+1}$ and $22_Q$ are also shown as examples.

For example, the display units $13_1$ and $13_2$ are in the settling period when the light-emitting period of the lighting unit $22_1$ starts in FIG. 5. However, the display units $13_3$ to $13_Q$ are in the rewriting period. Accordingly, the display units $13_3$ to $13_Q$ are in a state in which the video signal of the previous frame is written or during writing of a new video signal.

Figure 9:
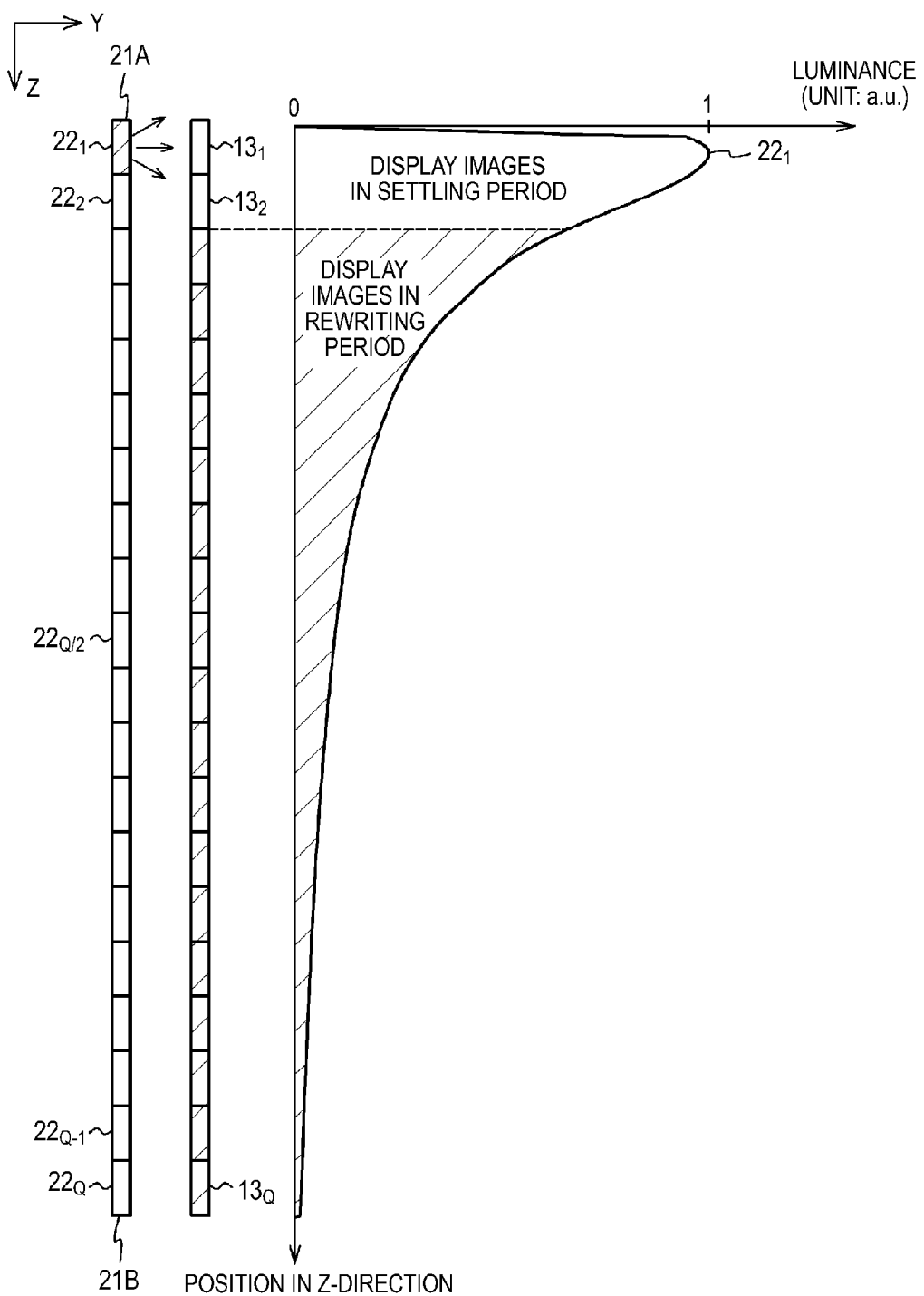
FIG. 9 is a schematic graph showing a luminance distribution of the lighting device lighting the display units obtained when a light-emitting period of a lighting unit in the first row is started.
Figure 10:
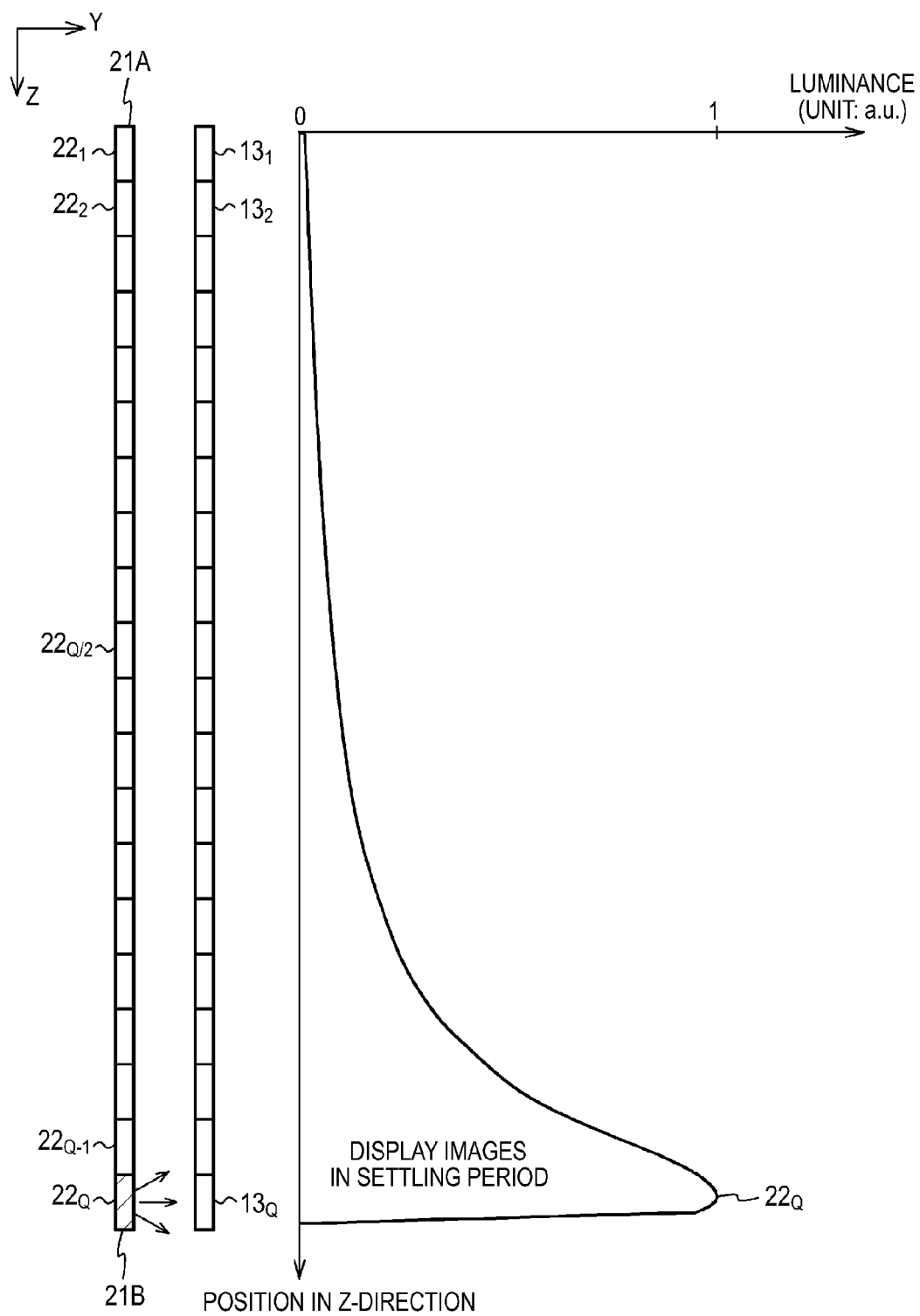
FIG. 10 is a schematic graph showing a luminance distribution of the lighting device lighting the display units obtained when a light-emitting period of a lighting unit in the Qth row is started.

FIG. 9 is a schematic graph showing a luminance distribution of the lighting device lighting the display units obtained when the light-emitting period of the lighting unit in the first row is started. FIG. 10 is a schematic graph showing a luminance distribution of the lighting device lighting the display units obtained when the light-emitting period of the lighting unit in the Qth row is started.

As shown in FIG. 9, the display units $13_3$ to $13_Q$ are irradiated with light in a certain degree of intensity also when the light source 23 corresponding to the lighting unit $22_1$ emits light. Accordingly, a shaded portion in the graph of FIG. 9 displays images in the rewriting period, which deteriorates image separation characteristics.

On the other hand, the display units $13_1$ to $13_Q$ are all in the settling period when the light-emitting period of the lighting unit $22_Q$ starts in FIG. 5. Therefore, the phenomenon in which light of the lighting device 20 displays images in the rewriting period does not occur as shown in FIG. 10.

As explained above, in the operation of the reference example, the phenomenon in which images in the rewriting period are displayed though the lighting units are scanned. It is possible to reduce the degree in which images in the rewriting period are displayed when applying the technology of the first embodiment. Hereinafter, an operation of the first embodiment will be explained with reference to FIG. 11 to FIG. 13.

FIG. 11 is a schematic diagram for explaining scanning of the lighting device according to the first embodiment. FIG. 12A is a schematic graph for explaining the relation between the scanning of the lighting device and waiting time in the reference example. FIG. 12B is a schematic graph for explaining the relation between the scanning of the lighting device and waiting time in the first embodiment.

In the first embodiment, a waiting time $t_a'$ is set to be nonlinearly decreased in accordance with the order of scanning the lighting units 22 in an area located on one end portion 21A (an upper end portion area) side and an area located on the other end portion 21B (a lower end portion area) side.

In the reference example, the waiting time $t_a$ is constant as shown in FIG. 12A. In contrast, according to the first embodiment, the length of the waiting time $t_a'$ is set so as to be the largest in the lighting unit $22_1$ in the first row as shown in FIG. 12B. Then, the waiting time is set to be nonlinearly decreased in accordance with the order of scanning the lighting units 22 in the upper end portion area and the lower end portion area. Though the waiting time is constant at a central portion area between the upper end portion area and the lower end portion area, the present disclosure is not limited to the example.

As the waiting time is set to be nonlinearly decreased as described above, a period from the time when the lighting unit 22 positioned close to one end portion 21A side emits light until the lighting unit 22 close to the other end portion 21B side is shorter than a period from the start to the end of sequential scanning of the display area.

Figure 13:
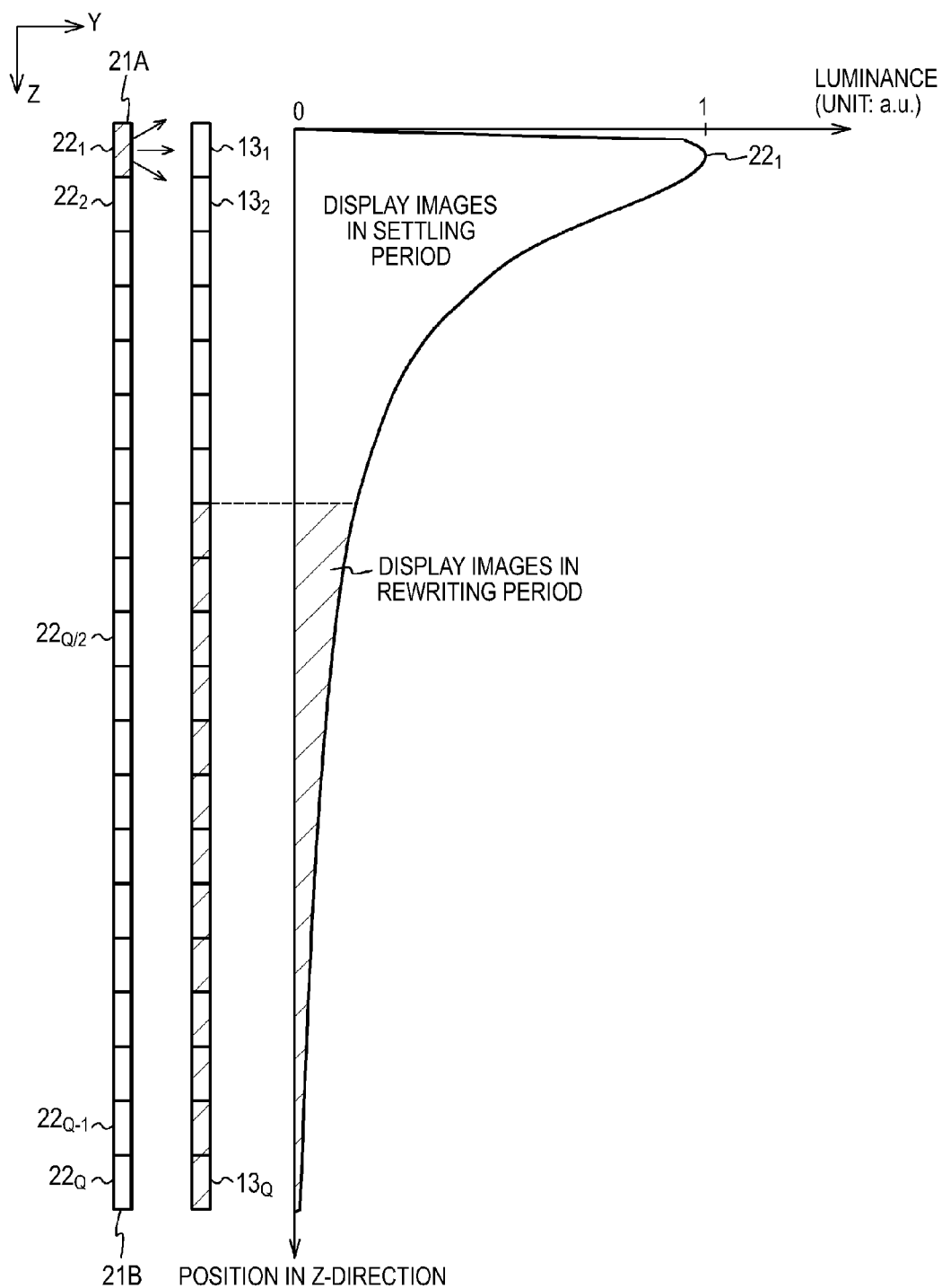
FIG. 13 is a schematic graph showing a luminance distribution of the lighting device lighting display units obtained when a light-emitting period of the lighting unit in the first row starts according to the first embodiment.

FIG. 13 is a schematic graph showing a luminance distribution of the lighting device lighting the display units obtained when the light-emitting period of the lighting unit in the first row starts according to the first embodiment.

For example, when focusing attention to a point when the light-emitting period of the lighting unit $22_1$ in the first row starts, the scanning of the display units 13 is in a more advanced state in the first embodiment as compared with the reference example. Accordingly, as shown in FIG. 13, it is possible to reduce the degree in which images in the rewriting period are displayed as compared with FIG. 9. The same is applied to other lighting units 22 located in the upper end portion area.

When applying the above setting, the length of waiting time of the lighting units 22 located in the upper end portion area can be sufficiently secured in contrast with the reference example.

It is possible to set the waiting time to be nonlinearly decreased only in the upper end portion area or it is possible to set the waiting time to be nonlinearly decreased only in the lower end portion area.

The deterioration in image separation characteristics is suppressed in the display apparatus 1. Accordingly, it is also possible to display 3D images having excellent image quality by displaying left-eye images and right-eye images alternately and by switching a so-called glasses-type optical shutter accordingly in the display apparatus 1.

Figure 14:
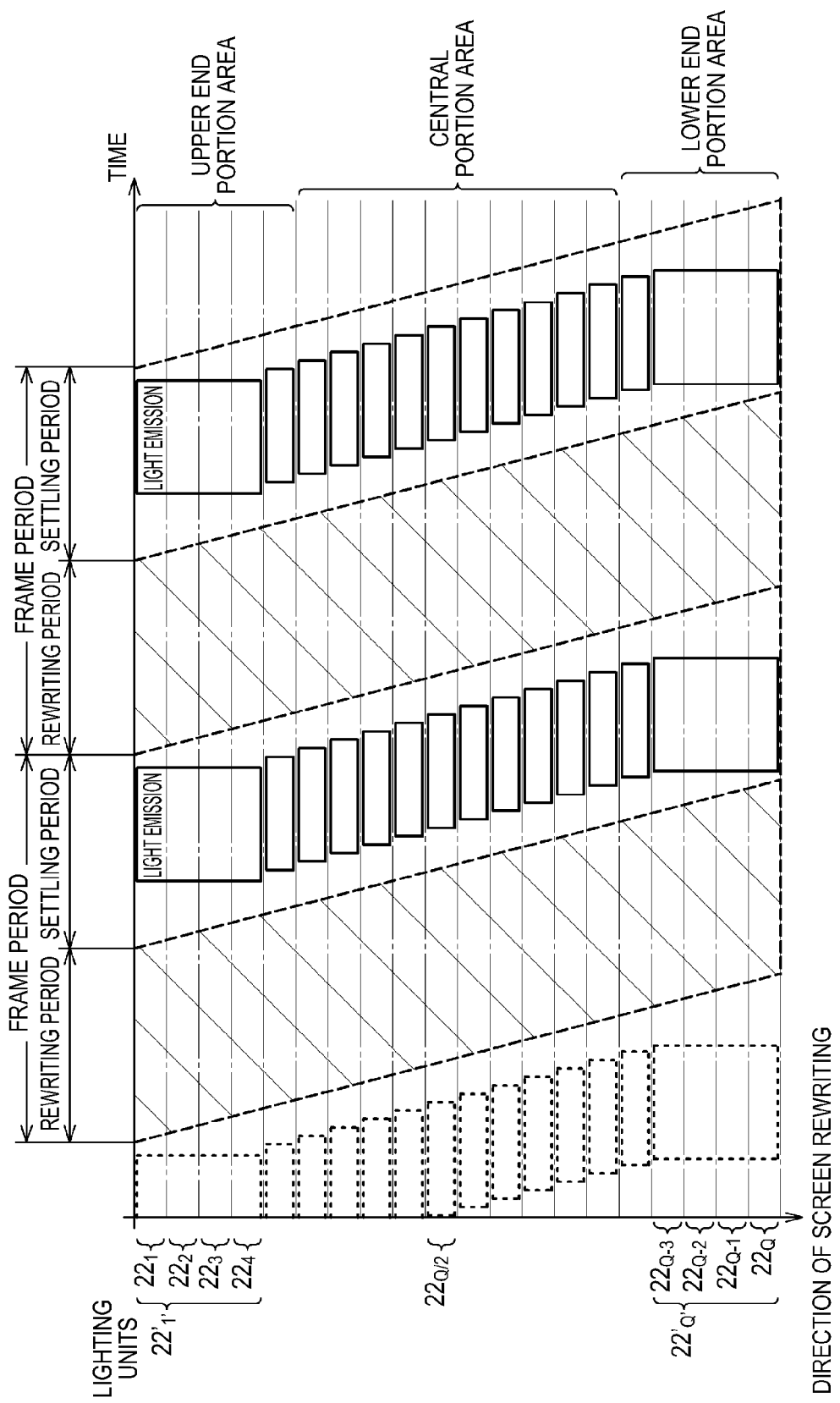
FIG. 14 is a schematic diagram for explaining scanning of the lighting device according to a modification example of the first embodiment.
Figure 15:
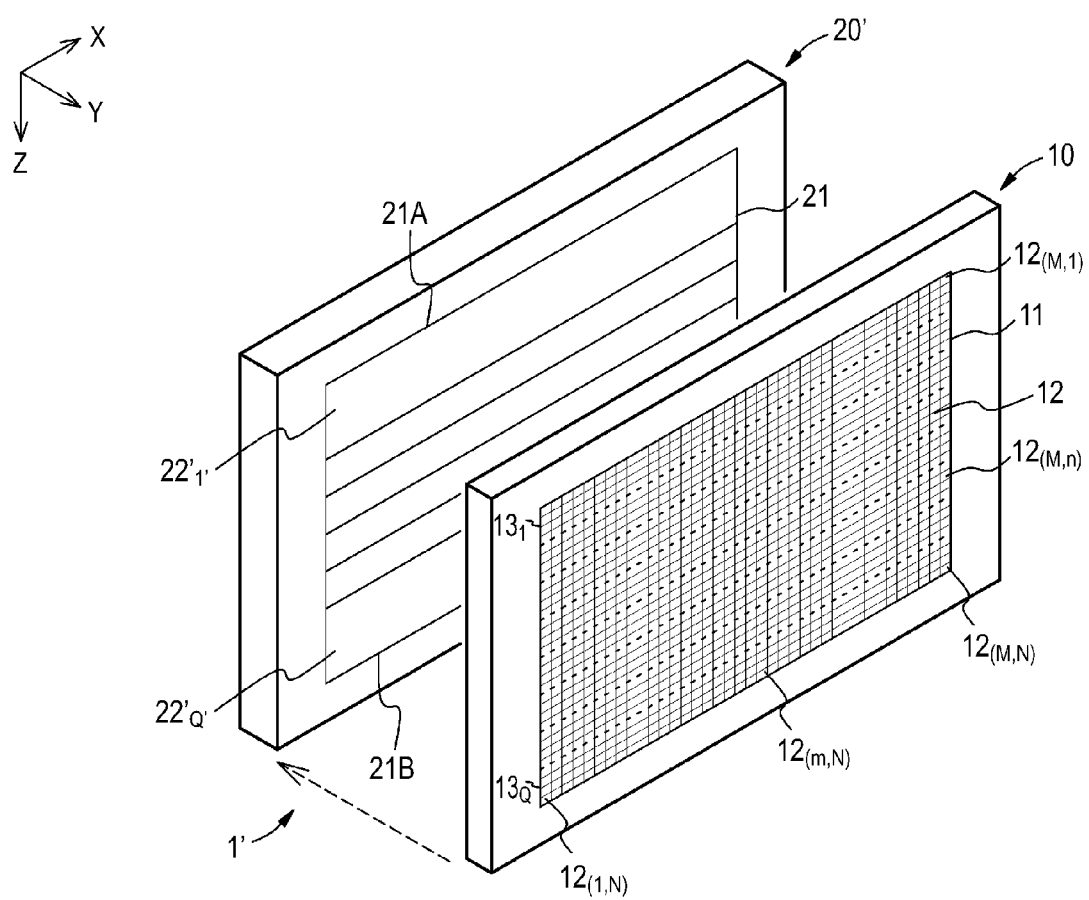
FIG. 15 is a conceptual display apparatus according to the modification example of the first embodiment.

Though the planer shapes of the lighting units are all the same in the above explanation, it is also possible to set a planer shape of the lighting units arranged close to the upper end and the lower end to be an enlarged shape. A schematic diagram for explaining scanning of the lighting device according to a modification example of the first embodiment is shown in FIG. 14. A conceptual view of a display apparatus 1' according to the modification example of the first embodiment is shown in FIG. 15. In the example shown in FIG. 14 and FIG. 15, a lighting device 20' in which lighting units 22 for four rows are replaced with one lighting unit 22' in the upper end and the lower end is used.

3. Second Embodiment

A second embodiment is a modification of the first embodiment. The second embodiment differs from the first embodiment in a point that the light-emitting period of a lighting unit arranged in an area located on the end portion side is shortened as the lighting unit is located closer to the end portion side.

A schematic perspective view of a display apparatus 2 according to the second embodiment is similar to that obtained by replacing the display apparatus 1 shown in FIG. 1 with the display apparatus 2, and a conceptual diagram of the display apparatus according to the second embodiment is similar to that obtained by replacing the display apparatus 1 shown in FIG. 3 with the display apparatus 2 as well as by replacing the lighting device drive circuit 103 with a lighting device drive circuit 203. The lighting device drive circuit 203 drives the lighting unit 22 arranged at the area located on the end portion side so that a lighting period is shortened as the lighting unit 22 is located closer to the end portion side.

As shown in FIG. 8 referred to in the first embodiment, the luminance of the lighting device 20 tends to be higher toward the end portion 21A in the area located on one end portion 21A side. Similarly, the luminance tends to be higher toward the end portion 21B in the area of the other end portion 21B side. Therefore, when scanning the lighting units 22, it is visually recognized so that the luminance increases toward the end portions from the central portion.

Accordingly, the lighting device drive circuit 203 drives the lighting unit 22 arranged in the area located on the end portion side so that the light-emitting period is shortened as the lighting unit 22 is located closer to the end portion side in the second embodiment.

Figure 17A:
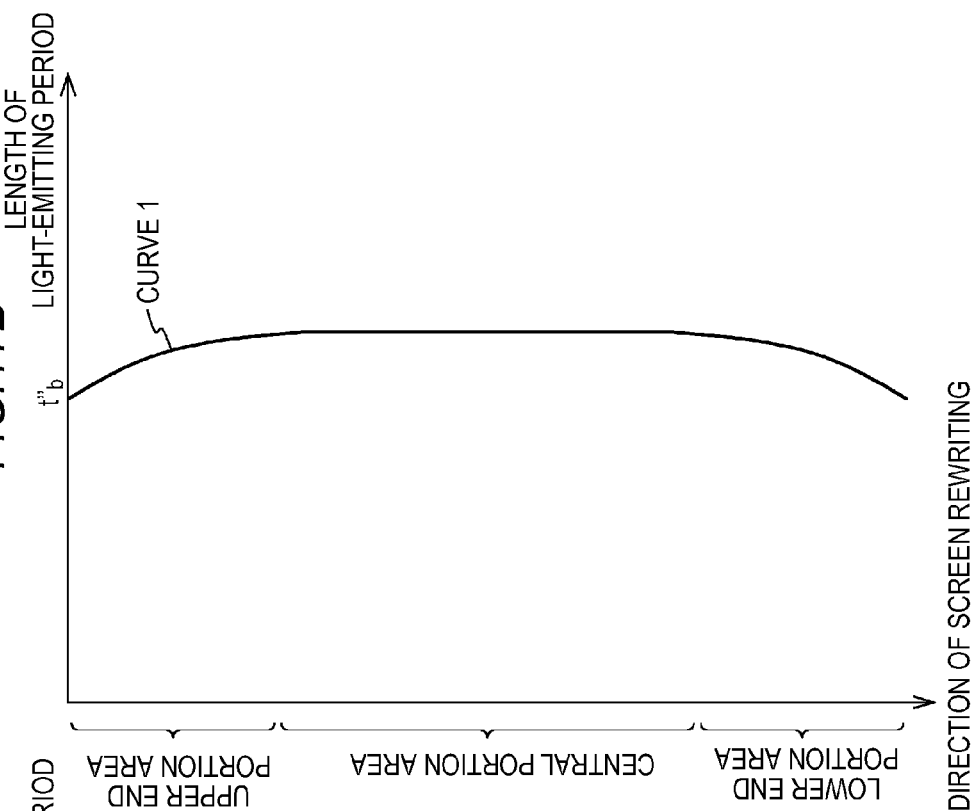
FIG. 17A is a schematic graph for explaining a length of the light-emitting period of the lighting device according to the first embodiment.
Figure 17B:
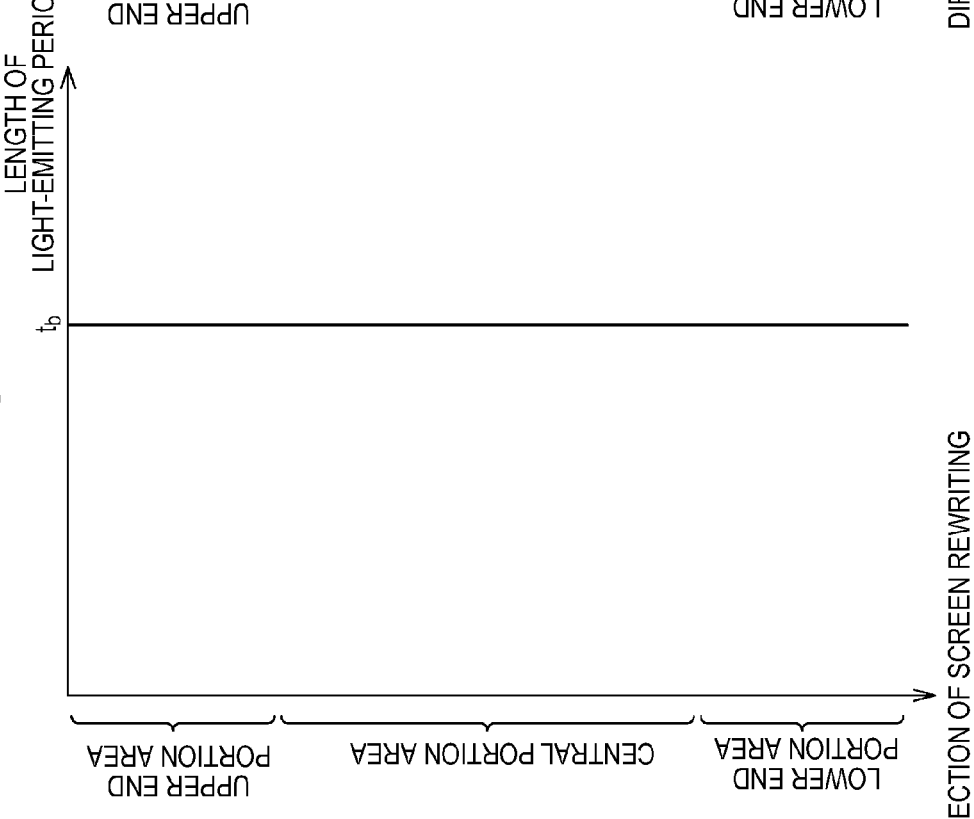
FIG. 17B is a schematic graph for explaining a length of the light-emitting period of the lighting device according to the second embodiment.

FIG. 16 is a schematic diagram for explaining scanning of the lighting device according to the second embodiment. FIG. 17A is a schematic graph for explaining the length of the light-emitting period of the lighting device according to the first embodiment. FIG. 17B is a schematic graph for explaining the length of the light-emitting period of the lighting device according to the second embodiment.

Since the light emitting period of the lighting unit 22 is set to be shorter as the lighting unit 22 is located closer to the end portion side, a value of a waiting time $t_a''$ in the upper end portion area shown in FIG. 16 can be set longer than the waiting time $t_a'$ described in the first embodiment. In the second embodiment, a length of a light-emitting period $t_b''$ is shortened toward the end portion 21A on the side of the upper end portion area as well as shortened toward the end portion 21B on the side of the lower end portion area.

As shown in FIG. 17A, the length of the light-emitting period $t_b$ of the lighting units 22 is constant regardless of the order of scanning in the first embodiment. In contrast, the length of the light-emitting period $t_b''$ is shortened toward the end portion as shown by a curve 1 of FIG. 17B.

Accordingly, the tendency in which the luminance is visually recognized to be higher toward the end portion from the central portion can be compensated to thereby improve uniformity of luminance in the image to be displayed. Additionally, as the value of the waiting time $t_a''$ in the upper end portion area can be set longer than that of the first embodiment, thereby improving image separation characteristics.

4. Third Embodiment

A third embodiment is a modification of the second embodiment. The third embodiment differs in a point that a light intensity of the lighting unit arranged in an area located on the end portion side, that is, the light intensity emitted by the lighting unit is set to be increased as the lighting unit is located closer to the end portion side. More specifically, the light intensity emitted by the light source belonging to the lighting unit, that is, the light intensity obtained when the light source emits light is set to be increased as the lighting unit is located closer to the end portion side.

First, an outline of the third embodiment will be explained.

FIGS. 18A and 18B are schematic graphs for explaining variations in characteristics obtained when the length of light-emitting period of the lighting units in end portion areas is set to be further shortened in the second embodiment.

In the above second embodiment, the explanation has been made that image separation characteristics can be improved by shortening the light-emitting period $t_b''$ toward the end portion as shown by the curve 1 of FIG. 17B. Accordingly, it is desirable to further shorten the light-emitting period $t_b''$ toward the end portion to have characteristics shown by a curve 2 as shown in FIG. 18A with the objective of further improvement of image separation characteristics.

However, if the uniformity of the image luminance is maintained by controlling the light-emitting period $t_b''$ in accordance with the curve 1 shown in FIG. 18A, the uniformity of the image luminance is deteriorated on the end portion side as shown in FIG. 18B when the light-emitting period $t_b''$ is controlled in accordance with the curve 2. Specifically, when the light-emitting period $t_b$" is controlled in accordance with the curve 2, the image luminance is reduced on the end portion side. A horizontal axis in FIG. 18B is shown by normalization, in which a case when, for example, the entire surface is displayed in uniform white display is set to 1. The same applies to FIG. 19B.

Accordingly, in the third embodiment, the light intensity of the lighting unit is set so as to compensate the reduction of image luminance on the end portion side.

FIGS. 19A and 19B are schematic graphs for explaining variations in characteristics obtained when the light intensity of the lighting units is changed.

When the light intensity of the lighting unit arranged on the end portion side at the time of emitting light is controlled to be increased as the lighting unit is located closer to the end portion side, the graph of the light intensity in the lighting units have characteristics shown by a broken line of FIG. 19A. A horizontal axis in FIG. 19A is shown by normalization, in which a case when amounts of light in respective units are constant is set to 1.

Accordingly, the reduction in image luminance on the end portion side is compensated as shown FIG. 19B even when the light-emitting period $t_b$" is controlled in accordance with the curve 2 shown in FIG. 18A. Therefore, the image separation characteristics can be further improved as well as reduction of the uniformity in image luminance can be prevented.

As described above, the outline of the third embodiment has been explained. The control of the light intensity of a lighting unit having a light source a light-emitting state of which can be controlled is performed so as to drive the light source of the lighting unit located closer to the end portion side to emit light brighter, for example, by controlling a peak value of electric current at the time of driving the light source. It is also possible to apply a configuration in which the density of arranging light sources in the lighting units arranged in the area located on the end portion side is set to be higher as the lighting unit is located closer to the end portion side.

A configuration example (hereinafter referred to as a first example) in which the light source of the lighting unit located closer to the end portion side is driven so as to emit light brighter will be explained. A schematic perspective view of a display apparatus 3A according to the first example can be obtained by replacing the display apparatus 1 shown in FIG. 1 with the display apparatus 3A. A conceptual diagram of the display apparatus according to the first example can be obtained by replacing the display apparatus 1 shown in FIG. 3 with the display apparatus 3A as well as by replacing the lighting device drive circuit 103 with a lighting device drive circuit 303. The lighting device drive circuit 303 drives the light source of the lighting unit located closer to the end portion side so as to emit light brighter.

Figure 20A:
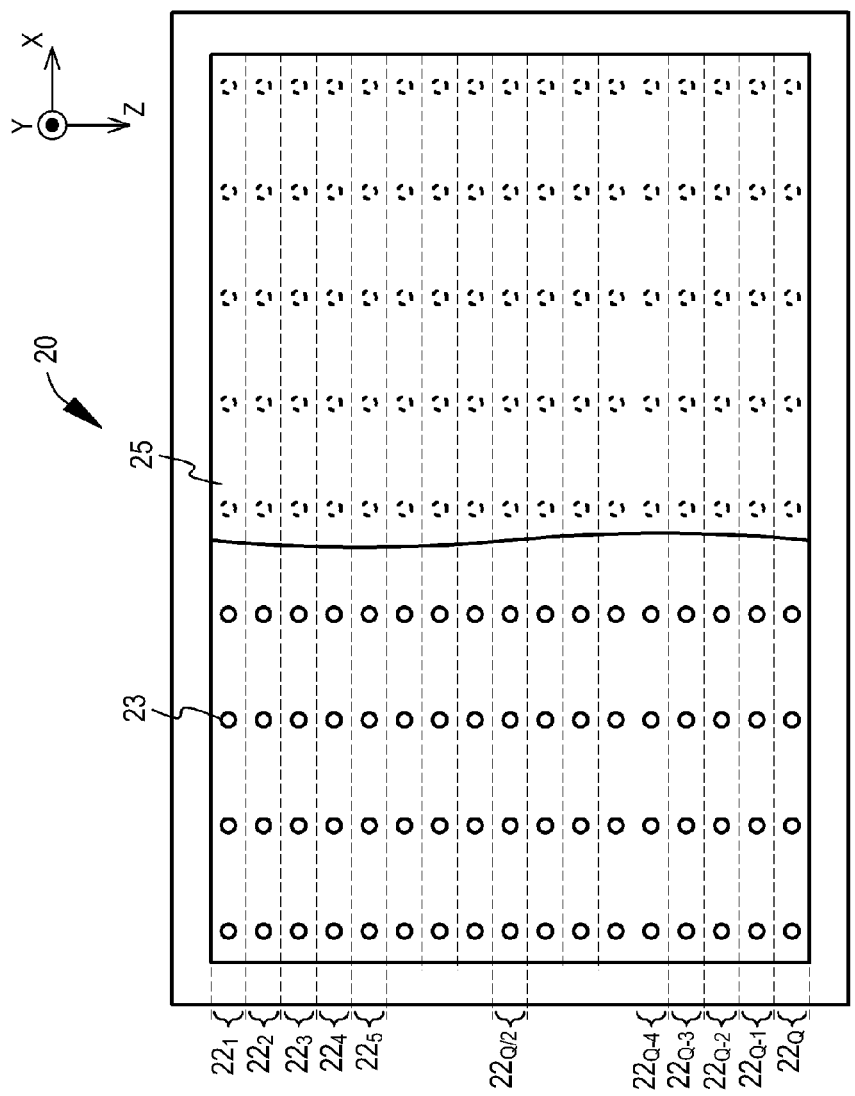
FIG. 20A is a schematic plan view for explaining a structure of a lighting device according to a first example in a third embodiment.
Figure 20B:
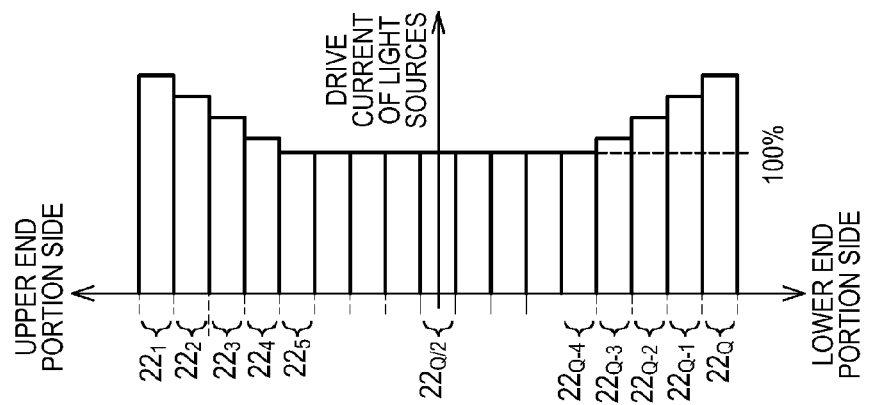
FIG. 20B is a schematic graph for explaining a setting of drive current driving light sources of the lighting device.

FIG. 20A is a schematic plan view for explaining a structure of the lighting device according to the first example in the third embodiment. FIG. 20B is a schematic graph for explaining a setting of drive current driving the light source of the lighting device.

As shown in FIG. 20B, the light source 23 of the lighting unit 22 located closer to the end portion side is designed to emit light brighter by changing a current value used when driving the light sources 23 of the lighting device 20 in units of lighting units 22. Specifically, the current value used when driving the light sources 23 of the lighting units 22 is set so as to be increased as the lighting unit 22 is located closer to the end portion side. In the shown example, the current values have the following relation with symbols of the lighting units: symbol $22_1$>symbol $22_2$>symbol $22_3$>symbol $22_4$>symbol $22_5$, symbol $22_5$=symbol $22_6$ . . . =symbol $22_{Q-4}$, symbol $22_{Q-4}$<symbol $22_{Q-3}$<symbol $22_{Q-2}$<symbol $22_{Q-1}$<symbol $22_Q$. How the current value is changed can be appropriately determined according to specifications of the display apparatus and the like.

Next, a configuration example (hereinafter referred to as a second example) in which the density of arranging light sources in the lighting unit arranged in the area located on the end portion side is set to be higher as the lighting unit is closer to the end portion side will be explained. A schematic perspective view of a display apparatus 3B and a conceptual diagram of the display apparatus according to the second example can be obtained by replacing the display apparatus 1 with the display apparatus 3B as well as by replacing the lighting device 20 with a lighting device 30 in FIG. 1 and FIG. 3.

Figure 21B:
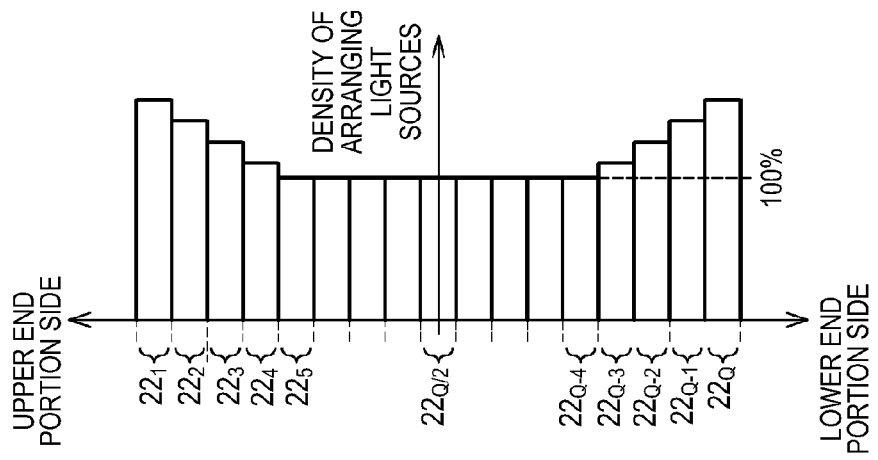
FIG. 21B is a schematic graph for explaining variation in the density of arranging the light sources of the lighting device.
Figure 21A:
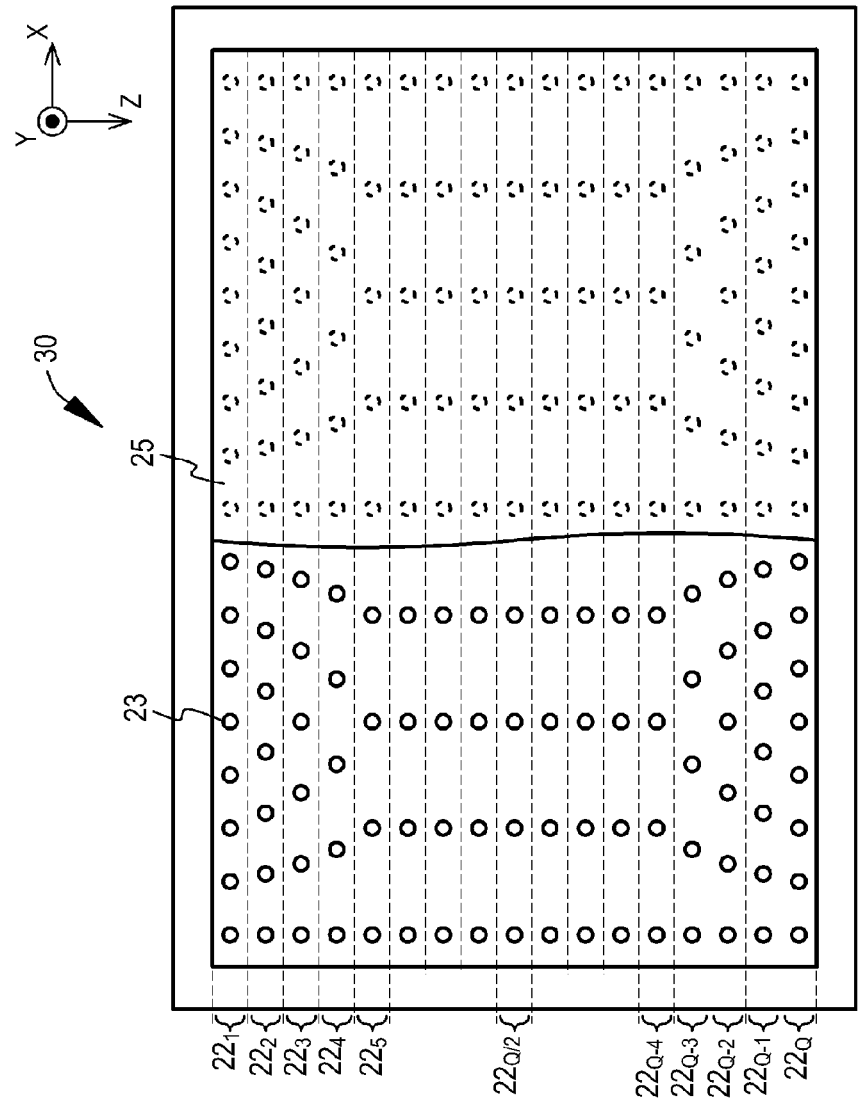
FIG. 21A is a schematic plan view for explaining a structure of the lighting device according to a second example in the third embodiment.

FIG. 21A is a schematic plan view for explaining a structure of the lighting device according to the second example in the third embodiment. FIG. 21B is a schematic graph for explaining variation in the density of arranging the light sources of the lighting device. For convenience in drawing, the light source 23 including light-emitting diodes 23R, 23G and 23B is represented as a single light source in FIG. 21A.

The lighting device 30 according to the second example has the direct-under type structure in the same manner as the lighting device 20. As shown in FIG. 21A, the lighting units 22 arranged in the area located on the end portion side are designed so that the density of arranging the light sources 23 is increased as the lighting unit is located closer to the end portion side. For example, the number of light sources belonging to the light unit 22 per a unit area has the following relation with symbols of the lighting units: symbol $22_1$>symbol $22_2$>symbol $22_3$>symbol $22_4$>symbol $22_5$, symbol $22_5$=symbol $22_6$ . . . =symbol $22_{Q-4}$, symbol $22_{Q-4}$<symbol $22_{Q-3}$<symbol $22_{Q-2}$<symbol $22_{Q-1}$<symbol $22_Q$. How the density of arranging light sources is changed can be appropriately determined according to specifications of the display apparatus and the like.

The lighting device 30 has the direct-under type structure in the second example, however, the lighting device may also have, for example, the edge light type structure. Hereinafter, a third example as a modification of the second example will be explained. A schematic perspective view of a display apparatus 3C and a conceptual diagram of the display apparatus according to the third example can be obtained by replacing the display apparatus 1 with the display apparatus 3C as well as by replacing the lighting device 20 with a lighting device 30A in FIG. 1 and FIG. 3.

Figure 22:
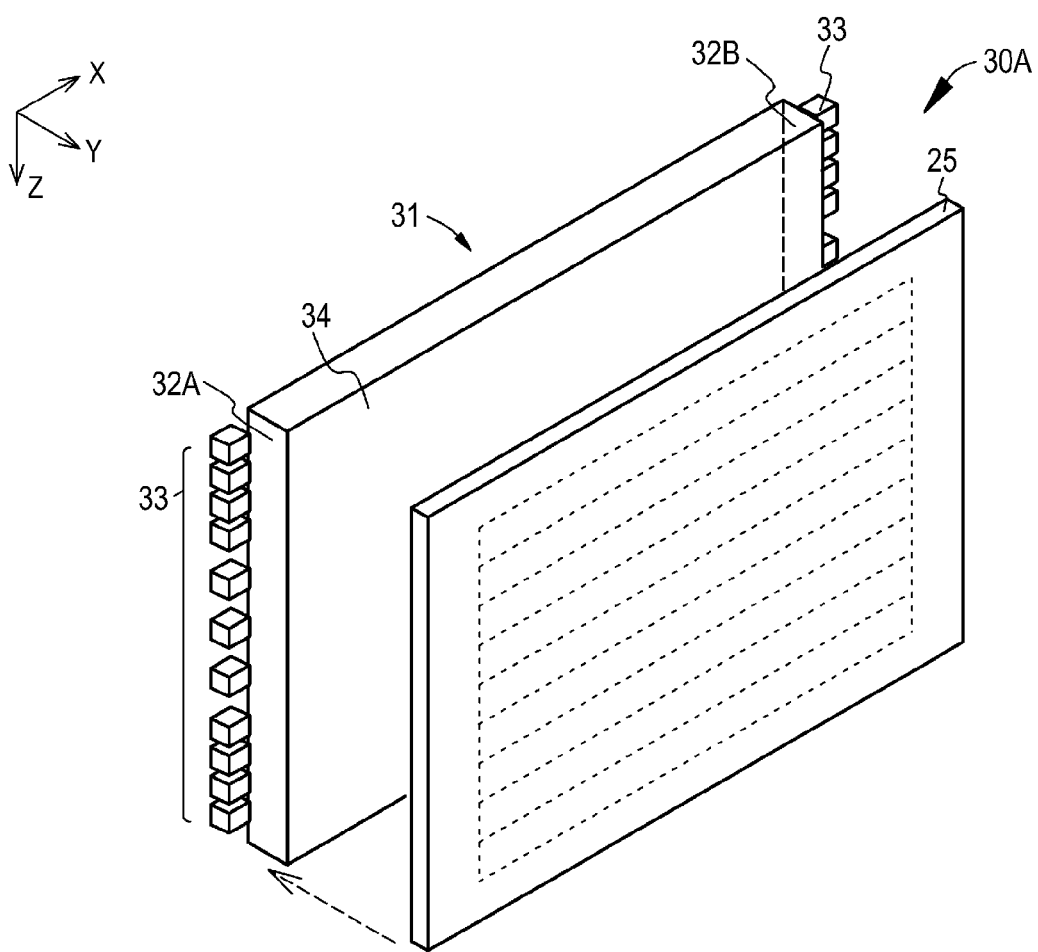
FIG. 22 is a schematic perspective view of a lighting device according to a third example of the third embodiment in a state of being virtually exploded.

FIG. 22 is a schematic perspective view of the lighting device according to the third example of the third embodiment in a state of being virtually exploded. For convenience in drawing, the arrangement of light sources 33 in FIG. 22 is shown in a simplified manner.

The lighting device 30A includes a light guide plate 31 made of, for example, transparent acrylic resin, the light sources 33 arranged so as to face light-entering end surfaces 32A and 32B extending in the Z-direction and made of, for example, a white light-emitting diode and an optical function sheet 25 arranged so as to face a light emitting surface 34 of the light guide plate 31.

On a surface opposite to light emitting surface 34 of the light guide plate 31, for example, a not-shown scattering reflection pattern is provided. The scattering reflection pattern is provided so as to be thicker in an area located farther from the light-entering end surfaces 32 for canceling nonuniformity of light intensity caused by getting away from the light-entering end surfaces 32. It is also preferable that a prismatic pattern extending in the X-direction is formed on the light guide plate 31 for increasing the light separation characteristics between adjacent lighting units.

FIG. 23A is a schematic plan view of part of the lighting device for explaining a structure of the lighting device according to the third example in the third embodiment. FIG. 23B is a schematic graph for explaining variation in the density of arranging the light sources of the lighting device.

As shown in FIG. 23A, in the lighting unit 22 arranged in the area located on one end portion side, the density of arranging light sources 33 is set to be higher as the lighting unit is located closer to the end portion side. For example, the number of light sources 33 belonging to the lighting unit 22 per a unit length in the Z-direction has the following relation with symbols of the lighting units: symbol $22_1$>symbol $22_2$>symbol $22_3$>symbol $22_4$>symbol $22_5$, symbol $22_5$=symbol $22_6$ . . . =symbol $22_{Q-4}$, symbol $22_{Q-4}$<symbol $22_{Q-3}$<symbol $22_{Q-2}$<symbol $22_{Q-1}$<symbol $22_Q$. How the density of arranging light sources is changed can be appropriately determined according to specifications of the display apparatus and the like.

5. Fourth Embodiment (Others)

A fourth embodiment is also a modification of the first embodiment. The fourth embodiment chiefly differs in a point that an optical separation device for separating an image to be displayed on the display device into images for plural viewpoints is further provided.

FIG. 24 is a schematic perspective view of a display apparatus according to the fourth embodiment in a state of being virtually separated.

As shown in FIG. 24, a display apparatus 4 according to the fourth embodiment also includes the transmissive-type display device 10 having the display area 11 which is sequentially scanned, and the lighting device 20 arranged on a rear face of the display device 10, including plural lighting units 22 arranged so as to be aligned in the direction from one end portion 21A toward the other end portion 21B along the direction in which the display area 11 is sequentially scanned. Then, an optical separation apparatus 40 for separating the image to be displayed on the display device 10 into plural viewpoint images is further provided.

As structures and operations of the display device 10 and the lighting device 20 are basically the same as structures and operations explained in the first embodiment, explanation is omitted.

Although the number of viewpoints of the image in the fourth embodiment will be described as four viewpoints $A_1$, $A_2$, $A_3$, and $A_4$ in each one of observation areas $WA_L$, $WA_C$, and $WA_R$ shown in FIG. 24, this is merely an example. The number of the observation areas and the number of viewpoints may be appropriately set based on the design of the display device 4. When a distance between the viewpoints is set to about 65 [mm], and parallax images at respective viewpoints are set to be observed, an image observer recognizes the displayed images as a stereoscopic image.

Figure 25:
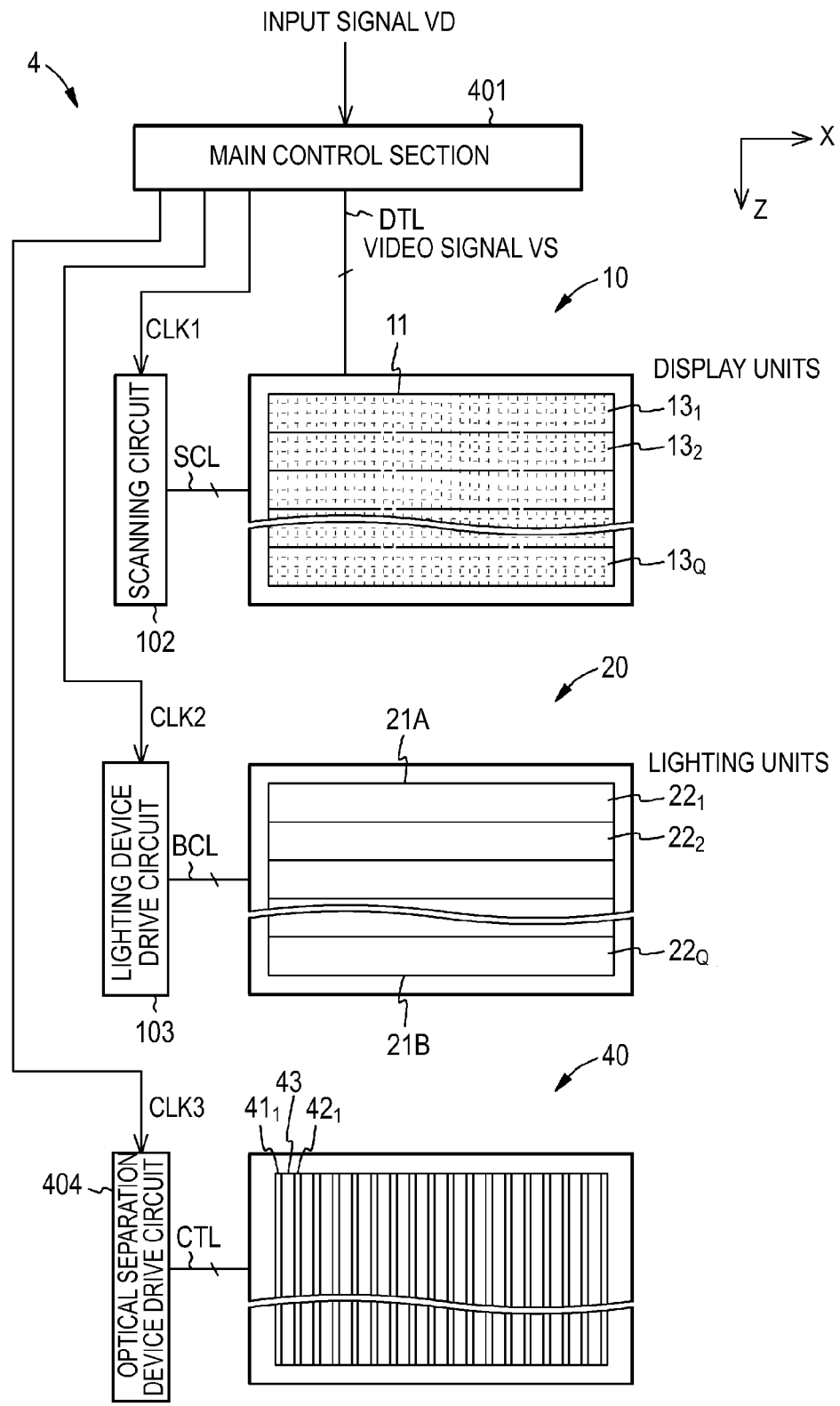
FIG. 25 is a conceptual diagram of the display apparatus according to the fourth embodiment.

FIG. 25 is a conceptual diagram of the display apparatus according to the fourth embodiment.

An optical-separation device drive circuit 404 is operated based on a clock signal CLK 3 from a main control section 401, appropriately changing states of a first opening/closing portion 41, a second opening/closing portion 42 and a third opening/closing portion 43 which will be described later. Accordingly, the image to be displayed on the display device 10 is separated into images of respective viewpoints. The other structures are similar to those of the first embodiment shown in FIG. 3, and thus the explanation thereof is omitted.

As shown in FIG. 24, the optical separation unit 40 includes a plurality of the first opening/closing portions 41, the second opening/closing portions 42 and the third opening/closing portions 43 extending in the vertical direction (Z-direction in the drawing) and aligned in the horizontal direction (X-direction in the drawing). The first opening/closing portion 41 and the second opening/closing portion 42 are alternately arranged with the third opening/closing portion 43 interposed therebetween in the horizontal direction. A barrier forming area 44 is formed by a plurality of the first opening/closing portions 41, the second opening/closing portions 42 and the third opening/closing portions 43 aligned in the horizontal direction. In the fourth embodiment, P-pieces of the first opening/closing portions 41 are arranged and (P−1)-pieces of the second opening/closing portions 42 are arranged. The number of the third opening/closing portions 43 is the same as the second opening/closing portions 42 in the fourth embodiment. The p-th (here, p=1, 2 . . . , P) first opening/closing portion 41 is denoted by a symbol 41p. The same applies to the second opening/closing portions 42. The first opening/closing portion 41, the second opening/closing portion 42 and the third opening/closing portion 43 may be collectively represented as opening/closing portions 41, 42 and 43. The relation between "P" and "M" will be explained with reference to FIG. 27 later.

Figure 26:
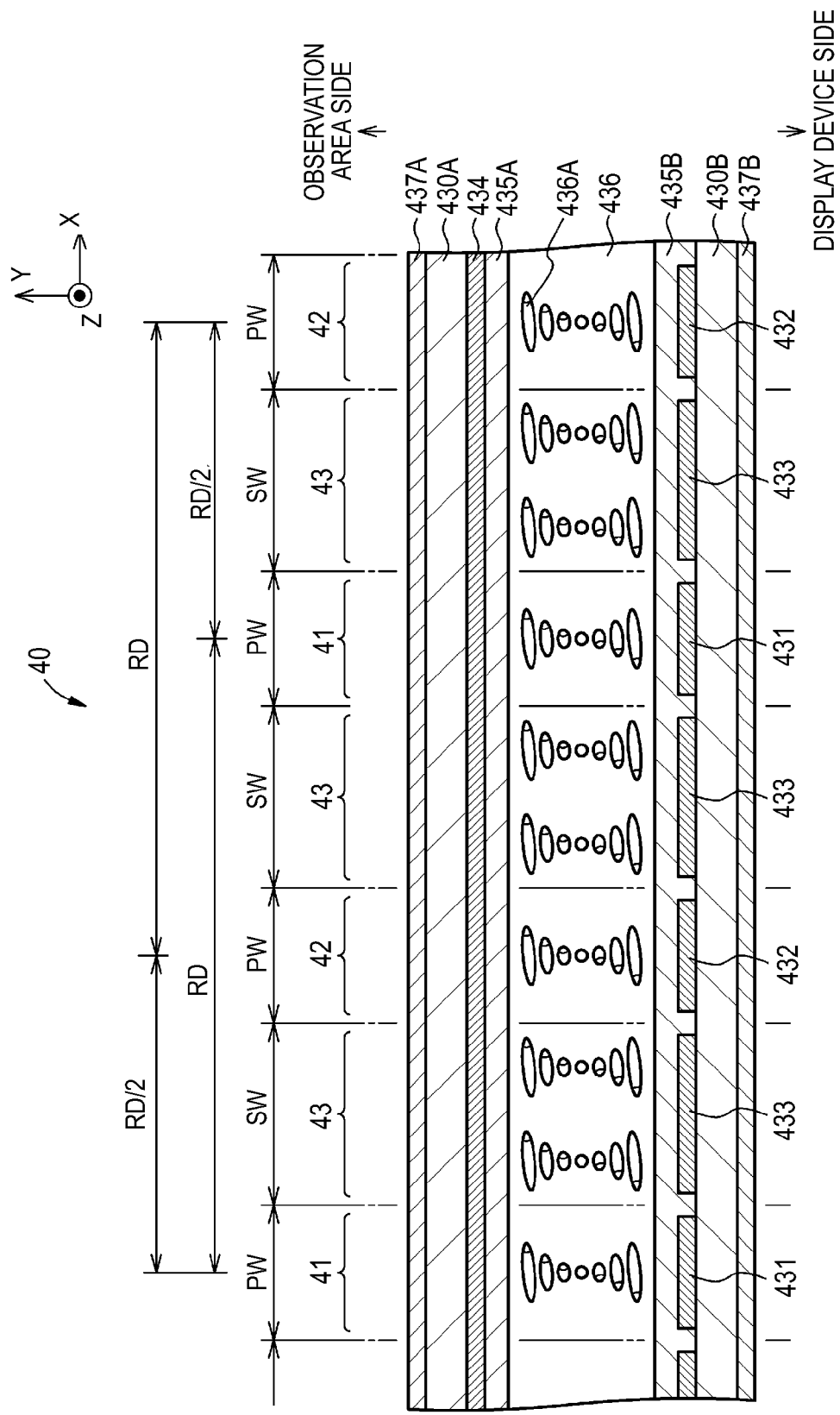
FIG. 26 is a partial cross-sectional view obtained when an optical separation device is cut off along a virtual plane parallel to an X-Y plane.

FIG. 26 is a partial cross-sectional view obtained when the optical separation device is cut off along a virtual plane parallel to the X-Y plane.

In FIG. 26, a symbol PW represents the width of the first opening/closing portion 41 or the second opening/closing portion 42 in the horizontal direction (X-direction in the drawing) and a symbol SW represents the width of the third opening/closing portion 43 in the horizontal direction. A pitch between the first opening/closing portions 41 and 41 adjacent to each other in the horizontal direction and a pitch between the second opening/closing portions 42 and 42 adjacent to each other in the horizontal direction are the same and are represented by a symbol RD. A pitch between the first opening/closing portion 41 and the second opening/closing portion 42 in the horizontal direction is RD/2.

The optical separation device 40 includes a pair of light-transmissive substrates 430A and 430B formed by, for example, glass substrates and a liquid crystal material layer 436 arranged between the substrates 430A and 430B, having a plurality of the opening/closing portions 41, 42 and 43 which can be switched into a light transmitting state or light shielding state. Then, the optical separation device 40 separates an image to be displayed on the display device 10 by setting predetermined opening/closing portions to be in the light transmitting state and other opening/closing portions to be in the light shielding state.

More specifically, a transparent common electrode 434 made of, for example, ITO is formed on the whole surface of the substrate 430A facing the liquid crystal material layer 436, and an alignment layer 435A made of, for example, polyimide is formed thereon. Additionally, a first transparent electrode 431, a second transparent electrode 432 and a third transparent electrode 433 made of, for example, ITO, and formed so as to correspond to respective opening/closing portions 41, 42 and 43 are formed on the substrate 430B facing the liquid crystal material layer 436. The first transparent electrode 431, the second transparent electrode 432 and the third transparent electrode 433 may be collectively represented as transparent electrodes 431, 432 and 433.

A planer shape of these transparent electrodes 431, 432 and 433 is an approximately stripe shape. On the substrate 430B including these transparent electrodes 431, 432 and 433, an alignment film 435B made of, for example, polyimide is formed. Moreover, the transparent common electrode 434 and the transparent electrodes 431, 432 and 433 may be configured to be replaced with each other.

On a surface of the first alignment film 435A facing the liquid crystal material layer 436, an alignment processing is performed, for example, in a direction making 335 degrees with respect to an X-axis in the X-Z plane by a well-known method such as rubbing processing. On the other hand, on a surface of the second alignment film 435B facing the liquid crystal material layer 436, the alignment processing is performed in a direction making 45 degrees with respect to the X-axis on the X-Z plane.

FIG. 26 illustrates a state where any electric field is not generated between the transparent common electrode 434 and the transparent electrodes 431, 432 and 433. In this state, a direction (also referred to as a "director") of a molecular axis of liquid crystal molecules 436A forming the liquid crystal material layer 436 makes about 335 degrees with respect to the X-axis on the X-Z plane on the substrate 430A side. Then, the direction of the molecular axis gradually changes and makes about 45 degrees with respect to the X-axis on the X-Z plane on the substrate 430B side. The liquid crystal material layer 436 is operated a so-called TN (twisted nematic) mode.

For the convenience of explanation, the polarizing axis of light emitted from the display device 10 is assumed to make 45 degrees with respect to the X axis on the X-Z plane according to a not-shown polarizing film stacked on the surface of the display device 10. On a surface of the substrate 430B facing the display device 10, a polarizing film 437B is stacked, and, on a surface of the substrate 430A facing the observation area side, a polarizing film 437A is stacked. The polarizing film 437B is stacked such that the polarizing axis makes 45 degrees with respect to the X axis on the X-Z plane, and the polarizing film 437A is stacked such that the polarizing axis makes 335 degrees with respect to the X axis on the X-Z plane. The polarizing films 437A and 437B are arranged to be in a state where the polarizing axes thereof are perpendicular to each other (cross Nichol). In addition, the not-shown polarizing film stacked on the surface of the display device 10 and the polarizing film 437B may be configured to be commonly shared.

All the first transparent electrodes 431 are electrically connected by not-shown wiring. Similarly, all the second transparent electrodes 432 are electrically connected by not-shown wiring, and further, all the third transparent electrodes 433 are electrically connected by not-shown wiring.

A fixed voltage (for example, 0 volts) is applied to the transparent common electrode 434, and independent voltages are applied to the first transparent electrode 431, the second transparent electrode 432 and the third transparent electrode 433 respectively based on the operation of the optical-separation device drive circuit 404.

An operation performed when any electric field is not generated between the transparent common electrode 434 and the transparent electrodes 431, 432 and 433, in other words, an operation performed when the voltages having the same value are applied to the transparent common electrode 434 and the transparent electrodes 431, 432 and 433 will be explained. In such a case, light incident on the liquid crystal material layer 436 through the polarizing film 437B has a polarizing direction to be changed by 90 degrees by the liquid crystal molecules 436A and transmitted through the polarizing film 437A. Accordingly, the optical separation device 40 is operated in a so-called normally white mode.

In a case where a fixed optical separation device is used, as will be described later, "resolution/the number of viewpoints of the display device" is the resolution of a stereoscopic image, therefore, the resolution of the stereoscopic image is decreased. According to the fourth embodiment, by using a dynamic optical separation device, the decrease in the resolution of the stereoscopic image can be alleviated.

In particular, in order to display one stereoscopic image, two images (a first field image and a second field image) are displayed on the display device 10. Then, based on the operations of the main control section 401 and the optical separation device driving circuit 404, only the first opening/closing portions 41 are set to be in the light transmitting state when the first field image is displayed, and only the second opening/closing portions 42 are set to be in the light transmitting state when the second field image is displayed. By setting all the opening/closing portions 41, 42, and 43 to be in the light transmitting state, an ordinary image can be displayed as well.

Figure 27:
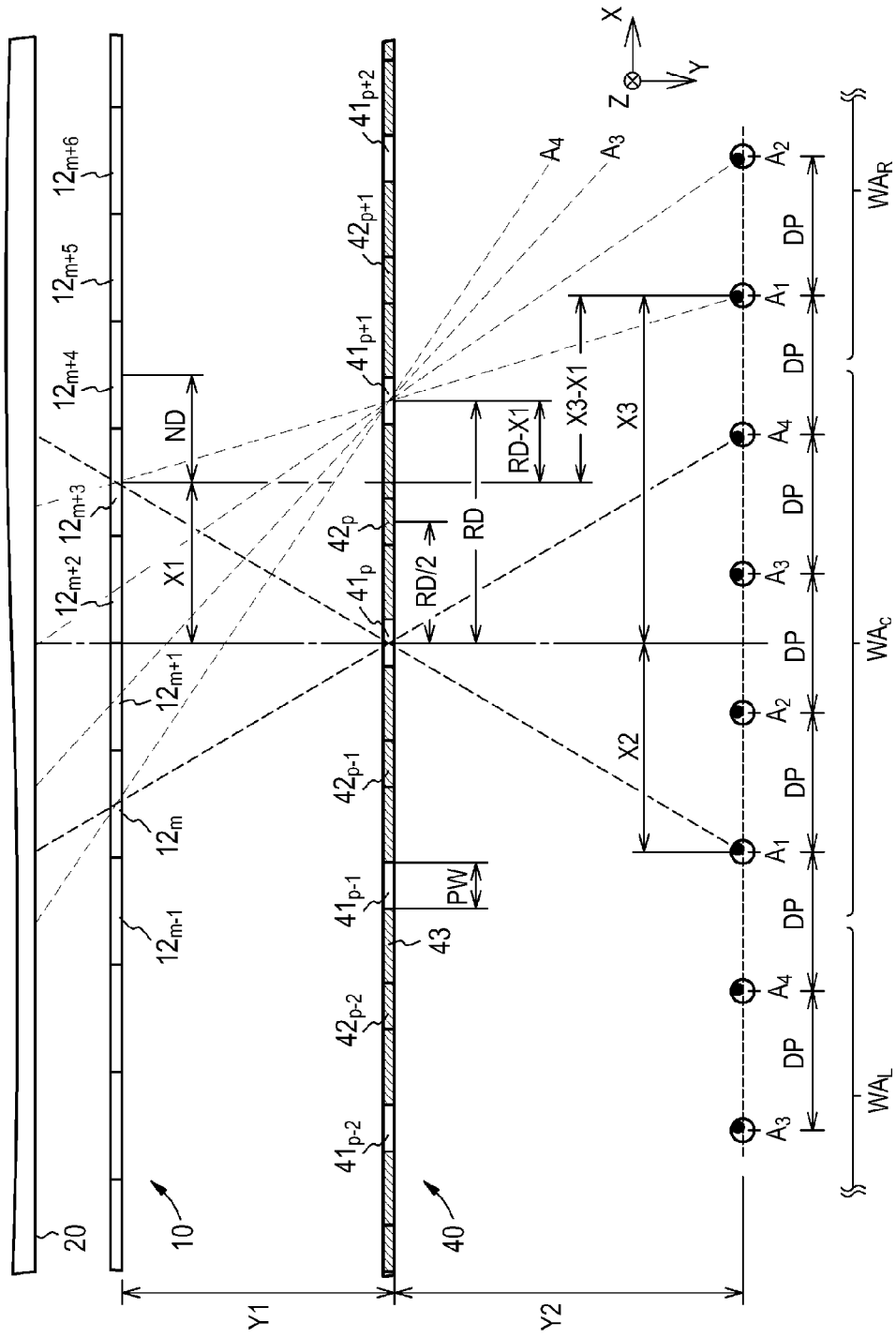
FIG. 27 is a schematic view for explaining conditions to be satisfied for allowing light of a pixel transmitted through a first opening/closing portion to travel toward viewpoints $A_1$ to $A_4$ located in an observation area.

FIG. 27 is a schematic view for explaining conditions to be satisfied for allowing light of a pixel transmitted through the first opening/closing portion to travel toward viewpoints $A_1$ to $A_4$ located in the observation area.

For convenience of explanation, it is assumed that a boundary of the (m+1)-th pixel $12_{m+1}$ and the (m+2)-th pixel $12_{m+2}$ and a center point between the viewpoints A2 and A3 in the observation area $WA_C$ are positioned on a virtual straight line that passes through the center of the first opening/closing portion $41_p$ and extends in the Y direction. Here, a pixel pitch is denoted by ND [mm]. In addition, a distance between the display device 10 and the optical separation device 40 is denoted by Y1 [mm], and a distance between the optical separation device 40 and the observation areas $WA_L$, $WA_C$, and $WA_R$ is denoted by Y2 [mm]. Furthermore, a distance between viewpoints adjacent to each other in the observation areas $WA_L$, $WA_C$, and $WA_R$ is denoted by DP [mm]. In addition, as described above, the pitch of the first opening/closing portions 41 in the horizontal direction and the pitch of the second opening/closing portions 42 in the horizontal direction are denoted by RD [mm].

In FIG. 27, the first opening/closing portions 41 are in the light transmitting state, and the second opening/closing portions 42 and the third opening/closing portions 43 are in the light shielding state. In addition, in order to clearly represent the light transmitting state and the light shielding state, the opening/closing portions in the light shielding state are shaded. The same applies to other drawings to be described later.

For convenience of explanation, it is assumed that the width PW of the first opening/closing portion 41 and the second opening/closing portion 42 is sufficiently small, and the explanation will be made by giving attention to an orbit of light passing through the center of the first opening/closing portion 41.

While a virtual straight line passing through the center of the first opening/closing portion $41_p$ and extending in the Y direction is used as a reference, a distance to the center of the pixel $12_{m+3}$ is denoted by X1, a distance to the viewpoint A1 of the observation area $WA_C$ at the center is denoted by X2, and a distance to the viewpoint A1 of the observation area $WA_R$ on the right side is denoted by X3. When light emitted from the pixel $12_{m+3}$ is transmitted through the first opening/closing portion $41_p$ and travels toward the viewpoint A1 of the observation area $WA_C$ at the center, based on the geometrical similarity, the condition represented in the following Equation (1) is satisfied.

$$Y1:X1=Y2:X2 \qquad (1)$$

Here, X1=1.5×ND and X2=1.5×DP, and accordingly, when these are reflected, Equation (1) is represented as in the following Equation (1').

$$Y1:1.5 \times ND = Y2:1.5 \times DP \quad (1')$$

When the above-described Equation (1') is satisfied, it is geometrically apparent that light emitted from the pixels $12_{m+2}$, $12_{m+1}$, and $12_m$ travels toward the viewpoints $A_2$, $A_3$, and $A_4$ of the observation area $WA_C$.

In addition, when light emitted from the pixel $12_{m+3}$ is transmitted through the first opening/closing portion $41_{p+1}$ and travels toward the viewpoint A1 of the observation area $WA_R$, based on the geometrical similarity, the condition represented in the following Equation (2) is satisfied.

$$Y1:(RD-X1)=(Y1+Y2):X3-X1 \quad (2)$$

Here, X1=1.5×ND and X3=2.5×DP, and accordingly, when these are reflected, Equation (2) is represented as in the following Equation (2').

$$Y1:(RD-1.5\times ND)=(Y1+Y2):(2.5\times DP-1.5\times ND) \quad (2')$$

When the above-described Equation (2') is satisfied, it is geometrically apparent that light emitted from the pixels $12_{m+2}$, $12_{m+1}$, and $12_m$ travels toward the viewpoints $A_2$, $A_3$, and $A_4$ of the observation area $WA_R$.

In addition, the condition that light emitted from the pixels $12_{m+3}$, $12_{m+2}$, $12_{m+1}$, and $12_m$ passes through the first opening/closing portion $41_{p-1}$ and travels toward the viewpoints $A_1$, $A_2$, $A_3$, and $A_4$ of the observation area $WA_L$ on the left side is similarly acquired by appropriately reversing the explanation relating to the light that passes through the first opening/closing portion $41_{p+1}$, and thus the explanation thereof is omitted.

The values of the distance Y2 and the distance DP are set to predetermined values based on the specifications of the display apparatus 4. In addition, the value of the pixel pitch ND is determined based on the structure of the display device 10. Based on Equations (1') and (2'), the following Equations (3) and (4) are acquired for the distance Y1 and the pitch RD.

$$Y1=Y2\times ND/DP \quad (3)$$

$$RD=4\times DP\times ND/(DP+ND) \quad (4)$$

For example, when the pixel pitch ND of the display device 10 is 0.500 [mm], the distance Y2 is 1500 [mm], and the distance DP is 65.0 [mm], the distance Y1 is about 11.5 [mm] and the pitch RD is about 1.95 [mm], which is about four times the value of the pixel pitch ND. Accordingly, the above-described "M" and "P" has the relation of M≅P×4.

As described above, the horizontal resolution of the image for each viewpoint that is separated by the optical separation device is decreased to M/4. Thus, in the optical separation device, by changing the states of the first opening/closing portions 41 and the second opening/closing portions 42, a decrease in the horizontal resolution is alleviated.

Figure 28:
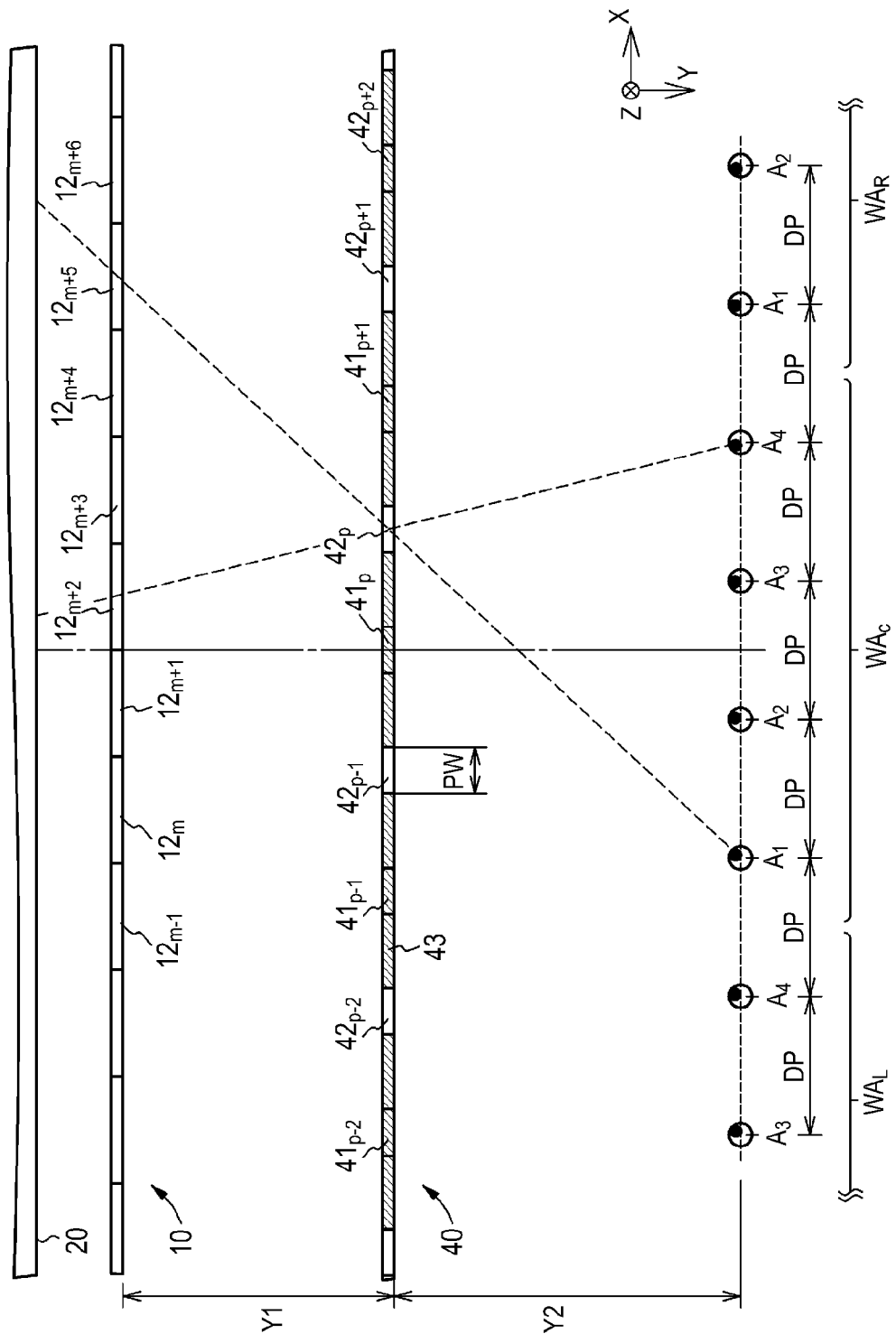
FIG. 28 is a schematic diagram for explaining light of a pixel transmitted through a second opening/closing portion and travels toward the viewpoints $A_1$ to $A_4$.

FIG. 28 is a schematic diagram for explaining light of a pixel transmitted through the second opening/closing portion and travels toward the viewpoints $A_1$ to $A_4$.

In FIG. 28, the second opening/closing portions 42 are in the light transmitting state, and the first opening/closing portions 41 and the third opening/closing portions 43 are in the light shielding state.

In such a case, for example, light emitted from pixels $12_{m+5}$, $12_{m+4}$, $12_{m+3}$, and $12_{m+2}$ is transmitted through the second opening/closing portion $42_p$ and travels toward the viewpoints $A_1$, $A_2$, $A_3$, and $A_4$ of the observation area $WA_C$ at the center. Accordingly, in FIGS. 27 and 28, the pixels facing each view point are shifted by two pixels. Therefore, by combining the state shown in FIG. 27 and the state shown in FIG. 28, the horizontal resolution of an image for each viewpoint is M/2.

FIG. 29 is a schematic diagram for explaining the scanning of the lighting device and the operation of the optical separation device according to the fourth embodiment.

In the fourth embodiment, one frame period is configured by a first field period and a second field period. In the first field period, the first opening/closing portions 41 of the optical separation device 40 are in the light transmitting state, and the second opening/closing portions 42 and the third opening/closing portions 43 are in the light shielding state. In addition, in the second field period, the second opening/closing portions 42 of the optical separation device 40 is in the light transmitting state, and the first opening/closing portions 41 and the third opening/closing portions 43 are in the light shielding state.

The operations of the display device 10 and the lighting device 20 in each field period are similar to the operations in the frame period explained in the first embodiment. In the image displayed on the display device 10 in each field period, the deterioration of the image separation characteristics is suppressed. Accordingly, since errors in parallax information of images visually recognized at respective viewpoints are decreased, a good stereoscopic image can be visually recognized.

As described above, although preferred embodiments of the present disclosure have been described, the present disclosure is not limited to the embodiments. The configurations and the structures of the display apparatuses described in the embodiments are examples and can be appropriately changed.

In the fourth embodiment, although the opening/closing portions of the optical separation device are formed in the shape of rows extending in the vertical direction, for example, a configuration in which the opening/closing portions obliquely extend so as to form an angle with respect to the vertical direction may be applied. In such a case, by arranging pin-hole shaped opening/closing portions so as to be obliquely connected to each other, a configuration in which the opening/closing portions obliquely extending on the whole are configured may be applied.

The present disclosure may also be configured as follows.

(1) A display apparatus including a transmissive-type display device having a display area which is sequentially scanned, and a lighting device arranged on a rear face of the display device, including plural lighting units arranged so as to be aligned in a direction from one end portion side toward the other end portion side along a direction in which the display area is sequentially scanned, in which the lighting units are in a light emitting state over a predetermined light emitting period after sequential scanning of display units including portions of the display area corresponding to the lighting units is completed, and the lighting units are sequentially scanned from one end portion side toward the other end portion side in accordance with the sequential scanning of the display area, and a length of waiting time from the completion of sequential scanning of the display unit until the corresponding lighting unit emits light is set to be nonlinearly decreased in accordance with the order of scanning the lighting units at least in an area located on one end portion side.

(2) The display apparatus described in the above (1),
in which the length of waiting time is set to be nonlinearly decreased in accordance with the order of scanning the lighting units in an area located on one end portion side and in an area located on the other end portion side.

(3) The display apparatus described in the above (1),
in which a period from the time when the lighting unit located on one end portion side emits light until the lighting unit located on the other end portion side emits light can be shorter than a period from the start to the end of sequential scanning in the display area.

(4) The display apparatus described in the above (1),
in which a light emitting period of the lighting unit arranged in the area located on the end portion side is set to be shortened as the lighting unit is located closer to the end portion side.

(5) The display apparatus described in the above (1),
in which light intensity of the lighting unit arranged in the area located on the end portion side is set to be increased as the lighting unit is located closer to the end portion side.

(6) The display apparatus described in the above (5),
in which each lighting unit has a light source a light-emitting state of which can be controlled, and
the light source of the lighting unit located closer to the end portion side is driven to emit light brighter.

(7) The display apparatus described in the above (5),
in which each lighting unit has a light source a light-emitting state of which can be controlled, and
the density of arranging light sources in the lighting unit arranged in the area located on the end portion side is set to be higher as the lighting unit is located closer to the end portion side.

(8) The display apparatus described in the above (1), further including
an optical separation device for separating an image to be displayed on the display device into images for plural viewpoints.

(9) The display apparatus described in the above (1),
in which the lighting device has a direct-under type structure.

(10) The display apparatus described in the above (1),
in which the lighting device has an edge-light type structure.

(11) The display apparatus described in the above (1),
in which the lighting device has three of more lighting units.

(12) The display apparatus described in the above (1),
in which the display device is formed by a liquid crystal display panel.

(13) A display apparatus including
a display device, and
a lighting device having plural lighting units,
in which the lighting units start to emit light after sequential scanning of a display area of a display device facing the lighting units is completed, and
a length of waiting time from the completion of sequential scanning of the display unit until the corresponding lighting unit starts to emit light is not constant.

The present disclosure contains subject matter related to that disclosed in Japanese Priority Patent Application JP 2012-094420 filed in the Japan Patent Office on Apr. 18, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a transmissive-type display device having a scanned display area;
a lighting device arranged on a rear face of the display device, the lighting device including a plurality of lighting units; and
an optical function sheet arranged on a surface of the lighting device,
wherein the lighting units are in a light emitting state for a predetermined period of time after scanning of display units including portions of the display area corresponding to the lighting units is completed, and the lighting units are scanned from one end portion side toward the other end portion side in accordance with the scanning of the display area, and
a length of time from when the completion of scanning of the display unit until the corresponding lighting unit emits light is nonlinearly decreased in accordance with the order of scanning the lighting units at least in an area located on one end portion side.

2. The display apparatus according to claim 1, wherein the length of time is set to be nonlinearly decreased in accordance with the order of scanning the lighting units in an area located on one end portion side and in an area located on the other end portion side.

3. The display apparatus according to claim 1, wherein a period from the time when the lighting unit located on one end portion side emits light until the lighting unit located on the other end portion side emits light is shorter than a period from the start to the end of sequential scanning in the display area.

4. The display apparatus according to claim 1, wherein a light emitting period of the lighting unit arranged in the area located on the end portion side is set to be shortened as the lighting unit is located closer to the end portion side.

5. The display apparatus according to claim 1, wherein light intensity of the lighting unit arranged in the area located on the end portion side is set to be increased as the lighting unit is located closer to the end portion side.

6. The display apparatus according to claim 5, wherein each lighting unit includes a light source having a controlled light-emitting state, and
an intensity of the light source of the lighting unit located closer to the end portion side is increased.

7. The display apparatus according to claim 5, wherein each lighting unit includes a light source having a controllable light-emitting state, and
the density of light sources in the lighting unit arranged in the area located on the end portion side is increased for each lighting unit located closer to the end portion side.

8. The display apparatus according to claim 1, further comprising:
an optical separation device that separates an image to be displayed on the display device into images for plural viewpoints.

9. The display apparatus according to claim 1, wherein the lighting device has a direct-under type structure.

10. The display apparatus according to claim 1, wherein the lighting device has an edge-light type structure.

11. The display apparatus according to claim 1, wherein the lighting device has three or more lighting units.

12. The display apparatus according to claim 1, wherein the display device is formed by a liquid crystal display panel.

13. A display apparatus comprising: a transmissive-type display device; a lighting device having plural lighting units;

and an optical function sheet arranged on a surface of the lighting device, wherein the lighting units start to emit light after scanning of a portion of a display area of the display device facing the lighting units is completed, and wherein a length of time from the completion of the scanning of the portion of the display area until the corresponding lighting unit starts to emit light is nonlinearly decreased in accordance with an order of scanning the lighting units.

14. The display apparatus according to claim 13, wherein the length of time is set to be nonlinearly decreased in accordance with the order of scanning the lighting units in an area located on one end portion side of the display area and in an area located on the other end portion side of the display area.

15. The display apparatus according to claim 13, wherein a period from the time when the lighting unit located on one end portion side of the display area emits light until the lighting unit located on the other end portion side of the display area emits light is shorter than a period from the start to the end of sequential scanning in the display area.

16. The display apparatus according to claim 13, wherein a light emitting period of the lighting unit arranged in the area located on the end portion side of the display area is set to be shortened as the lighting unit is located closer to the end portion side of the display area.

17. The display apparatus according to claim 13, wherein light intensity of the lighting unit arranged in the area located on the end portion side of the display area is set to be increased as the lighting unit is located closer to the end portion side of the display area.

18. The display apparatus according to claim 17, wherein each lighting unit includes a light source having a controlled light-emitting state, and an intensity of the light source of the lighting unit located closer to the end portion side of the display area is increased.

19. The display apparatus according to claim 17, wherein each lighting unit includes a light source having a controllable light-emitting state, and the density of light sources in the lighting unit arranged in the area located on the end portion side of the display area is increased for each lighting unit located closer to the end portion side of the display area.

20. The display apparatus according to claim 13, wherein the length of time is set to be nonlinearly decreased in accordance with the order of scanning the lighting units at least in an area located on one end portion side of the display area.

* * * * *